United States Patent
Tsutsumi et al.

(10) Patent No.: US 10,058,024 B2
(45) Date of Patent: Aug. 28, 2018

(54) PLANT TRANSPLANTING DEVICE

(71) Applicant: TSUBAKIMOTO CHAIN CO., Osaka-shi, Osaka (JP)

(72) Inventors: Kazuhiro Tsutsumi, Osaka (JP); Go Ito, Osaka (JP); Jun Ohshimo, Osaka (JP); Hitoshi Ohara, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 14/991,321

(22) Filed: Jan. 8, 2016

(65) Prior Publication Data
US 2016/0120114 A1  May 5, 2016

Related U.S. Application Data

(63) Continuation of application No. PCT/JP2014/052238, filed on Jan. 31, 2014.

(30) Foreign Application Priority Data

Jul. 10, 2013 (JP) ................................. 2013-144640

(51) Int. Cl.
*A01C 11/02* (2006.01)
*A01G 9/08* (2006.01)

(52) U.S. Cl.
CPC ............ *A01C 11/025* (2013.01); *A01G 9/085* (2013.01); *A01G 9/086* (2013.01)

(58) Field of Classification Search
CPC ........ A01G 9/085; A01G 9/086; A01G 9/083; A01G 9/1026; A01C 11/025; A01C 11/006

(Continued)

(56) References Cited

U.S. PATENT DOCUMENTS 3,712,252 A * 1/1973 Huang ................. A01C 11/025
111/105
5,104,278 A * 4/1992 Mayne ................... A01G 9/086
111/100

(Continued)

FOREIGN PATENT DOCUMENTS

EP 0 422 704 A2 4/1991
FR 2 580 457 A1 10/1986

(Continued)

OTHER PUBLICATIONS

International Search Report dated Apr. 28, 2014, issued in counterpart application No. PCT/JP2014/052238 (2 pages).

(Continued)

*Primary Examiner* — Peter M Poon
*Assistant Examiner* — Jeffrey R Larsen
(74) *Attorney, Agent, or Firm* — Westerman, Hattori, Daniels & Adrian, LLP

(57) ABSTRACT

The present invention provides a plant transplanting device that achieves rapid and stable transplantation with a simple structure and at low cost, prevents damage to the plants, and can be automated easily. A plant transplanting device 100 that transplants a seedbed B from a plant holder 110 to a growing pallet 120 includes a holder holding mechanism 130 for holding the plant holder 110, a pallet holding mechanism 140 for holding the growing pallet 120 above a holder holding position in which the holder holding mechanism 130 holds the plant holder 110, and a push-up mechanism 150 for pushing the seedbed B held in the holder seedbed-holding hole 111 upward so as to insert the seedbed B into the pallet seedbed-holding hole 121.

11 Claims, 21 Drawing Sheets

(58) Field of Classification Search
USPC .......... 47/65.9, 66.5, 73, 77, 1.01 P, 1.7, 65
See application file for complete search history.

(56) References Cited

U.S. PATENT DOCUMENTS

| | | | | |
|---|---|---|---|---|
| 5,257,889 | A * | 11/1993 | Suzuki | A01G 9/108 |
| | | | | 414/416.05 |
| 5,680,727 | A | 10/1997 | Sakaue et al. | |
| 2005/0016425 | A1* | 1/2005 | Huang | A01C 11/025 |
| | | | | 111/105 |
| 2015/0201551 | A1* | 7/2015 | Ohara | A01C 11/02 |
| | | | | 47/1.01 P |

FOREIGN PATENT DOCUMENTS

| | | |
|---|---|---|
| FR | 2 682 553 A1 | 4/1993 |
| FR | 2 802 386 A1 | 6/2001 |
| JP | 3-164113 A | 7/1991 |
| JP | 5-23051 A | 2/1993 |
| JP | 7-99850 A | 4/1995 |
| JP | 07-99852 A | 4/1995 |
| JP | 2741684 B2 | 4/1998 |
| JP | 11-31822 A | 11/1999 |
| JP | 2000-4699 A | 1/2000 |
| JP | 3010775 B2 | 2/2000 |
| JP | 2000-93027 A | 4/2000 |
| JP | 2004-242652 A | 9/2004 |
| JP | 3841550 B2 | 11/2006 |
| NL | 7900943 A | 8/1980 |

OTHER PUBLICATIONS

Extended European Search Report dated Feb. 10, 2017, issued in counterpart European Patent Application No. 14822647.5. (7 pages).

* cited by examiner

PLANT TRANSPLANTING DEVICE

TECHNICAL FIELD

The present invention relates to a plant transplanting device for transplanting a seedbed from a planter to a growing pallet.

BACKGROUND ART

A conventional automatic fixed planting device for a hydroponic seedling is constituted by a seedbed conveyor that is rotated intermittently and caused to reciprocate to the left and right in order to convey a seedbed, a fixed planting panel conveyor that is disposed below the seedbed conveyor in parallel therewith and rotated intermittently in order to convey a fixed planting panel, a plurality of openable gripping conveyors positioned above a front end portion of the seedbed conveyor in order to respectively grip and separate a plurality of bed pieces on a front end row of the seedbed on the seedbed conveyor and convey the bed pieces forward, a plurality of openable gripping inserters positioned in front of the plurality of openable gripping conveyors in order to grip and lower the bed pieces conveyed by the openable gripping conveyors so that the bed pieces are inserted into holes in the fixed planting panel on the fixed planting panel conveyor and thus planted, and an operating mechanism that is connected to the seedbed conveyor to cause the seedbed conveyor to reciprocate intermittently in a left-right direction by the width of one bed piece of the seedbed at a time (see PTL 1, for example).

CITATION LIST

Patent Literature

PTL 1: Japanese Patent Application Publication No. 2000-4699

SUMMARY OF INVENTION

Technical Problem

With the automatic fixed planting device of PTL 1, however, before the seedbed is set in the automatic fixed planting device, the seedbed must be extracted from a seedling container that is filled with water required by plant seeds sown in the seedbed to germinate. However, the seedbed is formed from a spongelike material or the like and is therefore soft, making it difficult to automate the process for extracting the seedbed from the seedling container. Hence, the process must be performed by human hands, leading to an increased work burden and an increase in the likelihood that the seedbed will be contaminated by sweat and bacteria from the human hands.

Further, the seedbed is handled by the openable gripping inserters by gripping a single block of the seedbed from above, and therefore plant shoots jutting out sideward from the seedbed may be damaged by the openable gripping inserters when the seedbed is gripped by the openable gripping inserters.

Furthermore, after the seedbed has been gripped by gripping pawls of the openable gripping inserters and inserted into the holes in the fixed planting panel, the gripping pawls of the openable gripping inserters must be opened in the left-right direction, and therefore cutouts through which the pawls can pass must be formed in the peripheral edges of the holes in the fixed planting panel. Hence, a typical, generally available fixed planting panel having rounded holes cannot be used, and as a result, a cost increase occurs.

Moreover, the soft seedbed cannot easily be gripped reliably by the openable gripping conveyors and the openable gripping inserters, and it is therefore difficult to handle the seedbed reliably.

Further, when handling the seedbed, the openable gripping conveyors and the openable gripping inserters must be opened in order to release the seedbed after gripping the seedbed, and therefore transplantation is time-consuming.

Furthermore, the openable gripping conveyors and the openable gripping inserters are required to grip and handle the seedbed, and therefore the device has a complicated structure, making the device expensive and more likely to break down.

The present invention has been designed to solve these problems, and an object thereof is to provide a plant transplanting device that achieves rapid and stable transplantation with a simple structure and at low cost, prevents damage to the plants, and can be automated easily.

Solution to Problem

The present invention solves the problems described above by providing a plant transplanting device for transplanting a seedbed from a planter in which a plurality of planter seedbed-holding holes penetrating in a vertical direction are arranged in a horizontal direction to a growing pallet in which a plurality of pallet seedbed-holding holes penetrating in the vertical direct ion are arranged in the horizontal direction, the plant transplanting device including a planter holding mechanism for holding the planter, a pallet holding mechanism for holding the growing pallet above a planter holding position in which the planter holding mechanism holds the planter, and a push-up mechanism for pushing the seedbed held in the planter seedbed-holding hole upward so as to insert the seedbed into the pallet seedbed-holding hole, wherein the push-up mechanism includes at least one push-up member capable of moving in the vertical direction, wherein the push-up mechanism is configured such that, by moving the push-up member upward, the push-up member pushes the seedbed held in the planter seedbed-holding hole upward and the push-up member inserts the seedbed into the pallet seedbed-holding holes from the bottom of the pallet seedbed-holding hole.

Advantageous Effects of Invention

According to the configuration described in claim 1, by employing a configuration in which the seedbeds held by the planter are transplanted into the growing pallet by being pushed up, the seedbeds can be set in the plant transplanting device simply by setting the planter holding the plurality of seedbeds in the plant transplanting device. Therefore, the soft seedbeds need not be handled directly, and as a result, the seedbeds can be handled more easily.

Accordingly, a process for extracting the seedbeds from a seedling container, which is performed before setting the seedbeds in the plant transplanting device, can likewise be performed simply by extracting the planter holding the plurality of seedbeds from the seedling container, and therefore the process can be automated easily. Furthermore, since the process can be automated easily, contamination of the seedbeds by human sweat and bacteria can be prevented.

Moreover, the soft seedbeds can be pushed up from below over a large surface without gripping the seedbeds from above, and therefore rapid and stable transplantation can be realized with a simple structure. Furthermore, damage to the plants projecting upwards from the seedbeds can be prevented.

Further, in a case where the seedbeds are transplanted by gripping the seedbeds, as in the automatic fixed planting device of PTL 1, cutouts through which the gripping pawls can pass must be formed in the peripheral edges of the pallet seedbed-holding holes, but with the configuration described in claim 1, the seedbeds are transplanted by pushing the seedbeds up, and therefore these cutouts are not required. Hence, a typical, generally available growing pallet can be used, enabling a cost reduction.

According to the configuration described in claim 2, by providing the planter with the thin plate-shaped partition, a seedbed can be cut into a plurality of seedbeds by the partition and the seedbeds can be housed in the plurality of planter seedbed-holding holes all at once simply by pressing the planter onto the seedbed. As a result, the seedbeds can be housed in the planter easily. Further, the seedbeds can be housed in the planter seedbed-holding holes without gaps, and therefore a holding strength by which the seedbeds are held in the planter seedbed-holding holes can be improved. Moreover, direct contact with the seedbeds by human hands can be avoided when housing the seedbeds in the planter, and therefore contamination of the seedbeds by human sweat and bacteria can be prevented.

According to the configuration described in claim 3, by providing the moving mechanism for moving the planter and the growing pallet relative to each other in the horizontal direction, a horizontal direction positional relationship between the planter seedbed-holding holes and the pallet seedbed-holding holes can be adjusted by the moving mechanism, and therefore improvements in design freedom can be obtained in relation to the planter and the growing pallet in terms of the sizes of the planter and the growing pallet, the formation positions of the planter seedbed-holding holes and the pallet seedbed-holding holes, and so on.

According to the configuration described in claim 4, by setting the first pitch between the planter seedbed-holding holes and the second pitch between the pallet seedbed-holding holes in the vertical direction so as to satisfy the equation $nP1=mP2$ (where P1 is the first pitch, P2 is the second pitch, n is an integer of 1 or more, and m is an integer of 1 or more), the plurality of seedbeds can be transplanted collectively in the vertical direction by a single push-up operation, and therefore rapid transplantation can be achieved.

According to the configuration described in claim 5, by setting the third pitch between the planter seedbed-holding holes and the fourth pitch between the pallet seedbed-holding holes in the horizontal direction so as to satisfy the equation $oP3=pP4$ (where P3 is the third pitch, P4 is the fourth pitch, o is an integer of 1 or more, and p is an integer of 1 or more), the plurality of seedbeds can be transplanted together in the horizontal and vertical directions by a single push-up operation, and therefore rapid transplantation can be achieved.

According to the configuration described in claim 6, by providing the table for carrying the growing pallet, the float-up restricting portion that restricts upward movement of the growing pallet relative to the table, and the positioning portion that positions the table in the horizontal direction, and forming the plurality of guide holes in the table in an identical arrangement to the plurality of pallet seedbed-holding holes, the growing pallet can be prevented from tilting or shifting position on the table, and the seedbeds can be guided reliably by the guide holes in the table when the seedbeds are pushed up. As a result, the seedbeds can be transplanted smoothly into the pallet seedbed-holding holes.

According to the configuration described in claim 7, by forming at least a part of the inner peripheral surface of the guide hole in a tapered shape so as to decrease in diameter upward, the seedbed can be corrected to a correct attitude corresponding to the tapered shape of the guide hole when the seedbed passes through the guide hole after being pushed out of the planter seedbed-holding hole, and as a result, damage to the plant projecting from the seedbed can be prevented.

According to the invention described in claim 8, by providing the tapered portion that increases in diameter upward in the pallet seedbed-holding hole on the upper surface side of the growing pallet, the plant projecting from the seedbed can open out horizontally even while the seedbed passes through the pallet seedbed-holding hole, and therefore stress on the plant can be avoided.

According to the invention described in claim 9, by providing the push-up member for pushing up the seedbed with a plurality of gripping arms, the seedbed can be gripped by the gripping arms while the seedbed is pushed up even when the seedbed being pushed up is partially connected to an adjacent seedbed, or when the push-up member does not pierce the center of the seedbed correctly, and so on. As a result, the seedbed can be transplanted reliably.

According to the invention described in claim 10, by providing the opening/closing control cam portion that controls the horizontal direction interval between the plurality of gripping arms and causing the cam follower portion fixed to the push-up member to slide against the opening/closing control cam portion, the horizontal direction interval between the gripping arms can be controlled using the vertical direction movement of the push-up member. As a result, the seedbed can be gripped and released reliably while being pushed up without providing individual driving means or the like for moving the gripping arms in the horizontal direction.

According to the invention described in claim 11, by providing the opening/closing control cam portion with the opening area portion in which the interval between the plurality of gripping arms is controlled to an interval at which the seedbed is not gripped, and the closing area portion formed above the opening area portion, in which the interval between the plurality of gripping arms is controlled to an interval at which the seedbed is gripped, and by providing the closing area portion with the temporary opening area portion in which the interval between the plurality of gripping arms is widened, an operation for gripping the seedbed when the seedbed is pushed out of the planter seedbed-holding hole and releasing the seedbed when the seedbed is inserted into the pallet seedbed-holding hole can be achieved reliably with a simple configuration.

[Reference Signs List]

Figure 1:
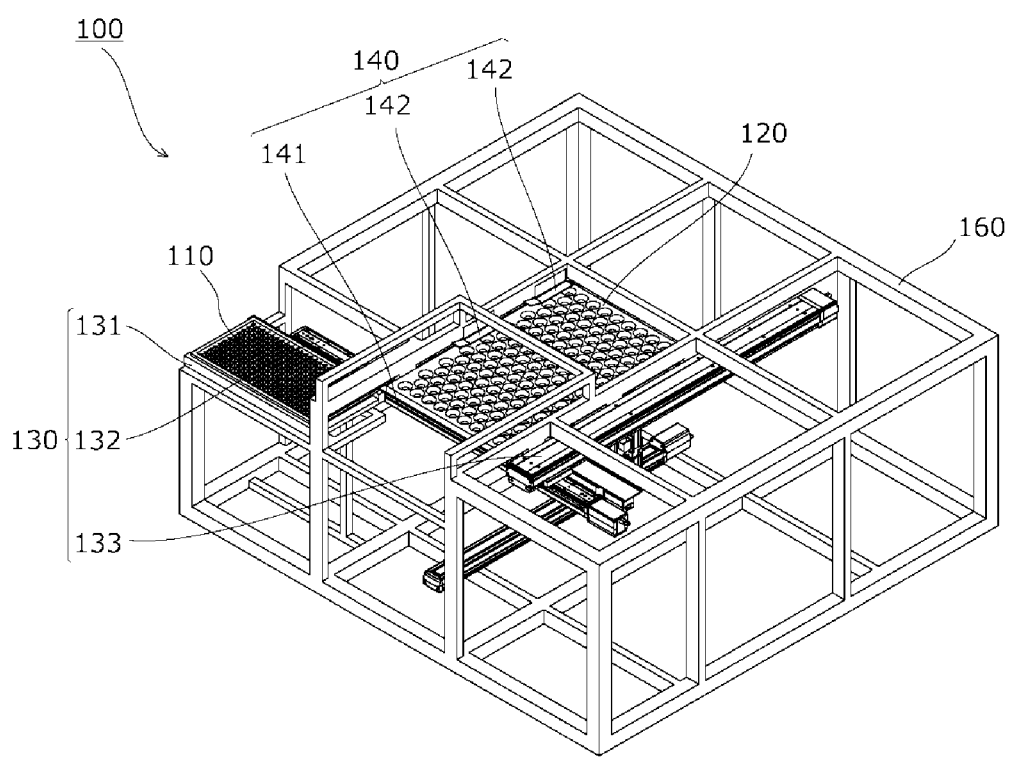
FIG. 1 is a perspective view showing an initial condition of a plant transplanting device according to a first embodiment of the present invention.

100, 200 plant transplanting device
110, 410, 510 planter
111, 411, 511 planter seedbed-holding hole
112, 512 partition
113, 413, 513 flange portion
414 holding pin -continued

[Reference Signs List]

415 connecting portion
516 cutout portion
120, 220 growing pallet
121, 221 pallet seedbed-holding hole
121a upward tapering portion (tapering portion)
121a' upward countersink portion
121b downward tapering portion
121b' downward countersink portion
130 planter holding/moving mechanism (planter holding mechanism, moving mechanism)
131 planter holding member
132 horizontal direction linear actuator
133 vertical direction linear actuator
140 pallet holding mechanism
141 table
141a guide hole
142 float-up restricting portion
150, 250 push-up mechanism
151, 251 push-up linear actuator
251a main body portion
251b vertical movable portion
152, 252 push-up member
252a gripping arm
252b arm support portion
252c cam follower portion
153 horizontal direction movement linear actuator
154 vertical direction linear actuator
255, 355 arm control member
256, 356 opening/closing control cam portion
256a, 356a opening area portion
256b, 356b closing area portion
256c, 356c shift area portion
256d temporary opening area portion
160 frame
B, B' seedbed
S plant shoot
P1 first pitch (vertical direction pitch between planter seedbed-holding holes)
P2 second pitch (vertical direction pitch between pallet seedbed-holding holes)
P3 third pitch (horizontal direction pitch between planter seedbed-holding holes)
P4 fourth pitch (horizontal direction pitch between pallet seedbed-holding holes)

DESCRIPTION OF EMBODIMENTS

As long as the present invention is a plant transplanting device for transplanting a seedbed from a planter in which a plurality of planter seedbed-holding holes penetrating in a vertical direction are arranged in a horizontal direction to a growing pallet in which a plurality of pallet seedbed-holding holes penetrating in the vertical direction are arranged in the horizontal direction, the plant transplanting device including a planter holding mechanism for holding the planter, a pallet holding mechanism for holding the growing pallet above a planter holding position in which the planter holding mechanism holds the planter, and a push-up mechanism for pushing the seedbed held in the planter seedbed-holding hole upward so as to insert the seedbed into the pallet seedbed-holding hole, thereby realizing rapid and stable transplantation with a simple structure and at low cost, preventing damage to the plants, and facilitating automation, there are no limitations on the specific configuration thereof.

For example, in an embodiment to be described below, the growing pallet is disposed in a fixed condition while the planter and the push-up mechanism are moved in the horizontal direction. The present invention is not limited to this specific embodiment, however, and instead, for example, the planter may be disposed in a fixed condition while the growing pallet and the push-up mechanism are moved in the horizontal direction.

Embodiments

A plant transplanting device 100 serving as a first embodiment of the present invention will be described below on the basis of the drawings.

Figure 2:
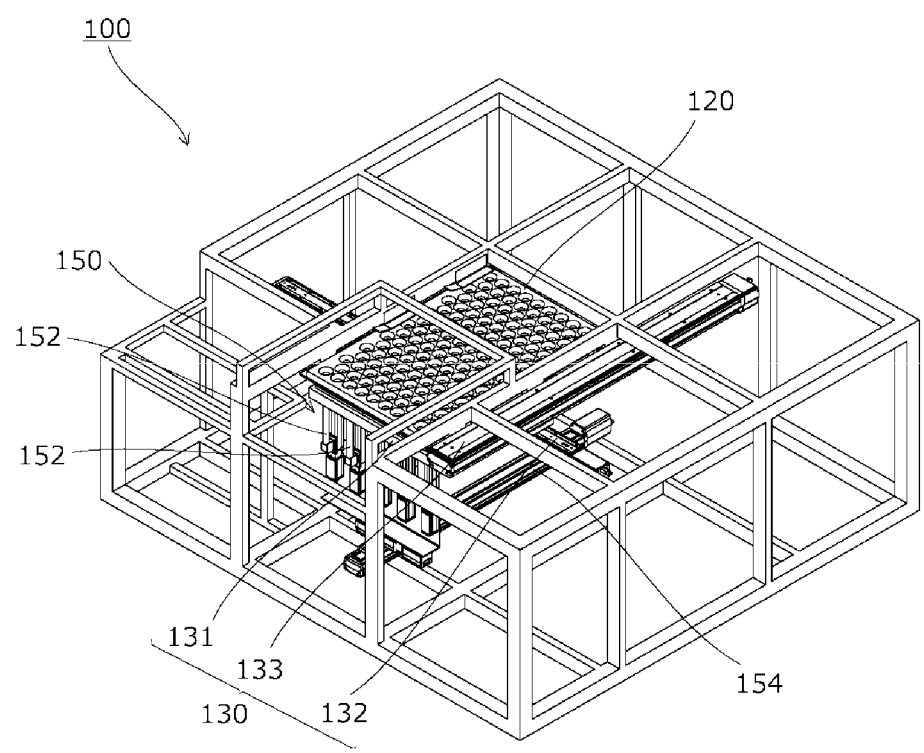
FIG. 2 is a perspective view showing a condition of the plant transplanting device when transplanting seedbeds on a front side row of a planter.
Figure 3:
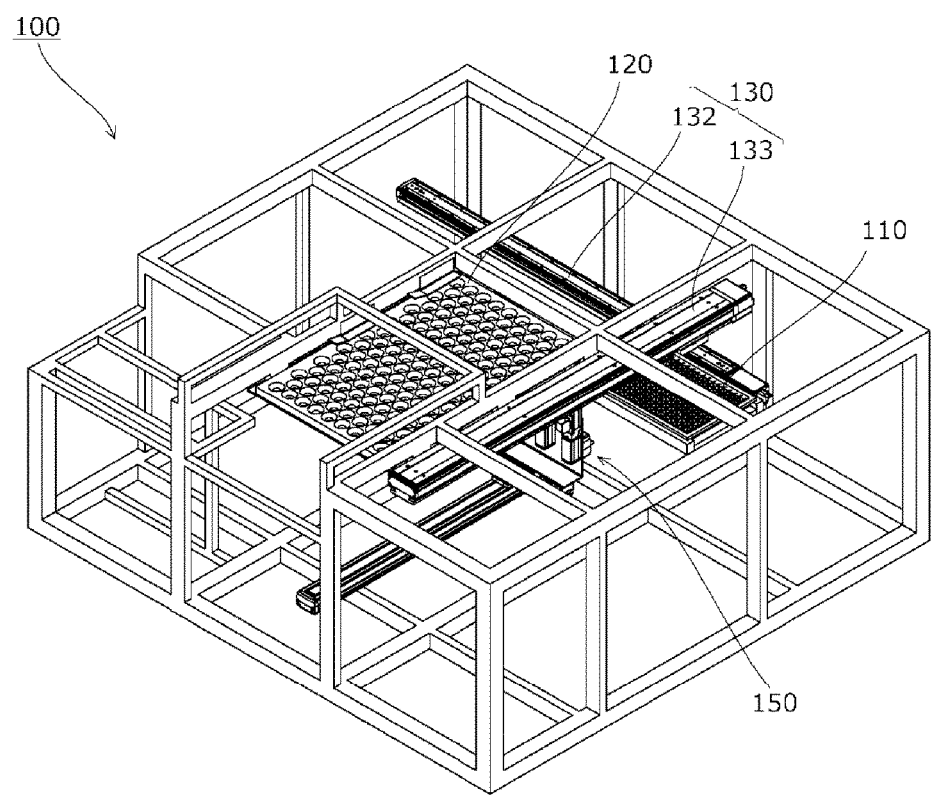
FIG. 3 is a perspective view showing a condition of the plant transplanting device when transplanting seedbeds on a back side row of the planter.
Figure 4:
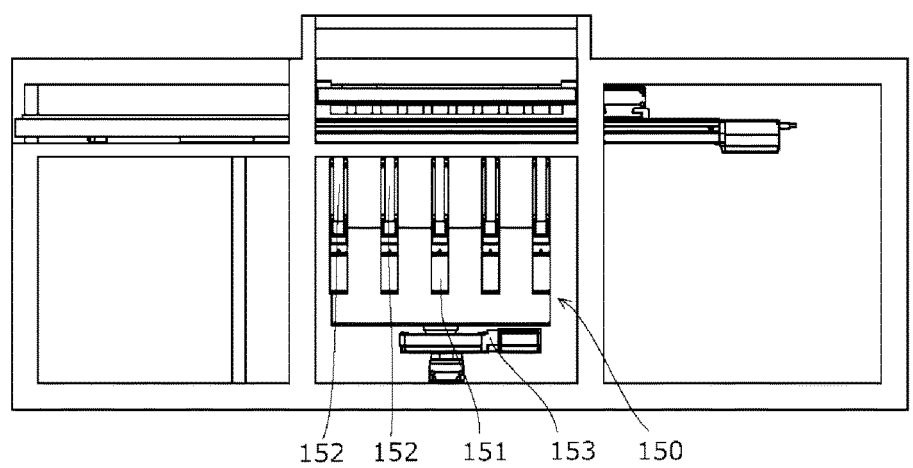
FIG. 4 is a front view of the plant transplanting device shown in FIG. 1.
Figure 5:
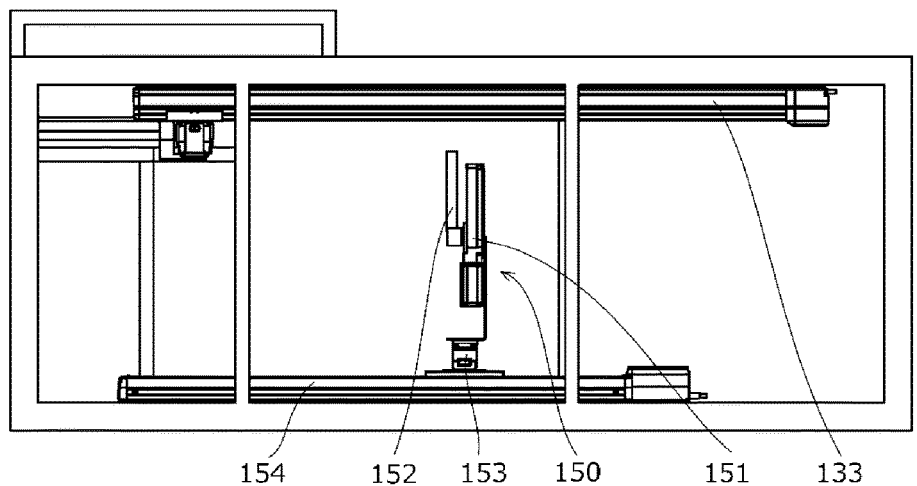
FIG. 5 is a side view of the plant transplanting device shown in FIG. 1.

As shown in FIGS. 1 to 3, the plant transplanting device 100 includes a lattice-shaped planter 110, a growing pallet 120, a seedling container (not shown), a planter holding/moving mechanism 130, a pallet holding mechanism 140, a push-up mechanism 150, a handling mechanism (not shown) for moving the planter 110, and a frame 160 for supporting various parts such as the planter holding/moving mechanism 130, the pallet holding mechanism 140, and the push-up mechanism 150. The plant transplanting device 100 transplants seedbeds B held by the planter 110 into the growing pallet 120, which is larger in size than the planter 110.

Figure 6:
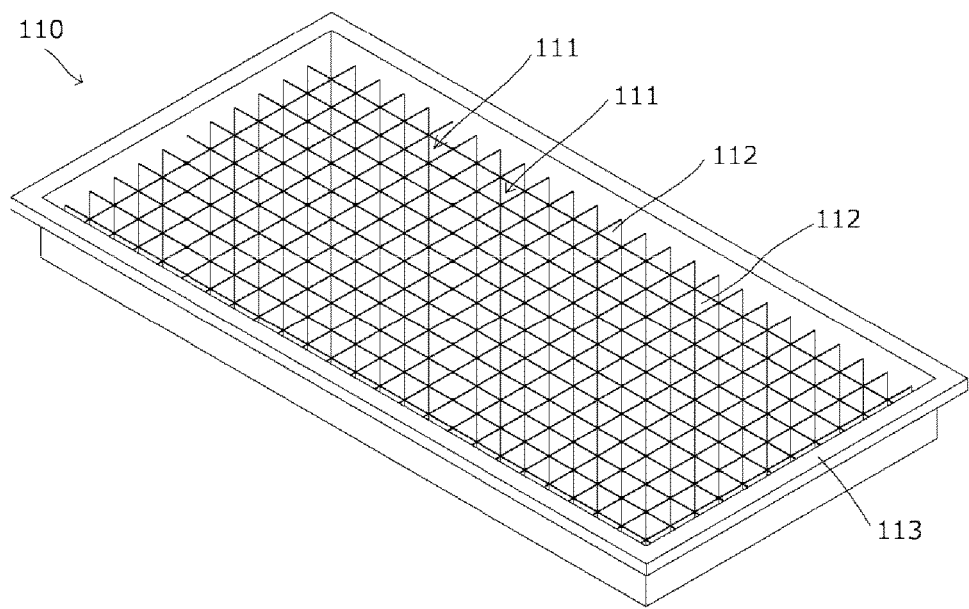
FIG. 6 is a perspective view showing the planter.
Figure 7:
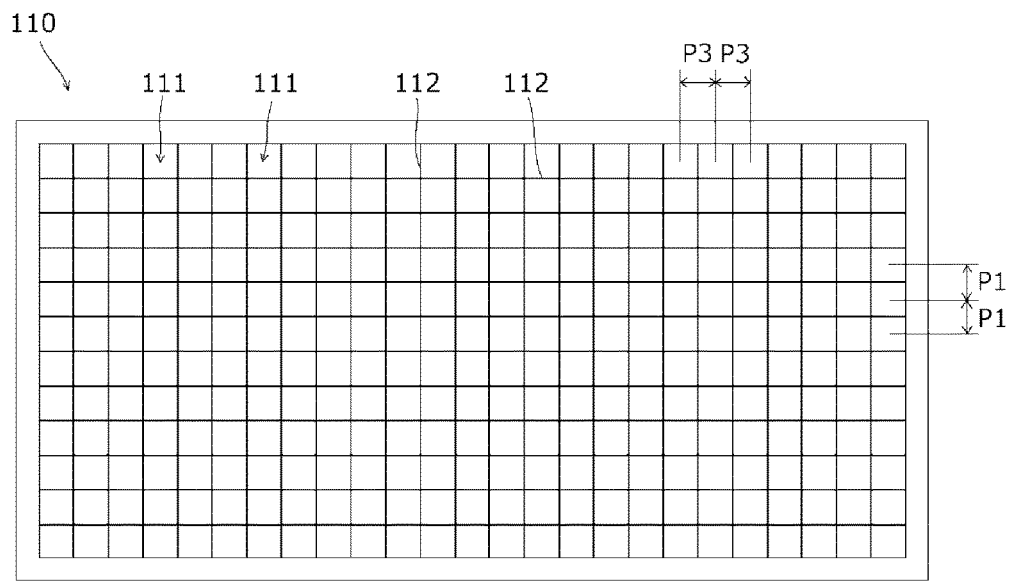
FIG. 7 is a top view showing the planter.
Figure 8:
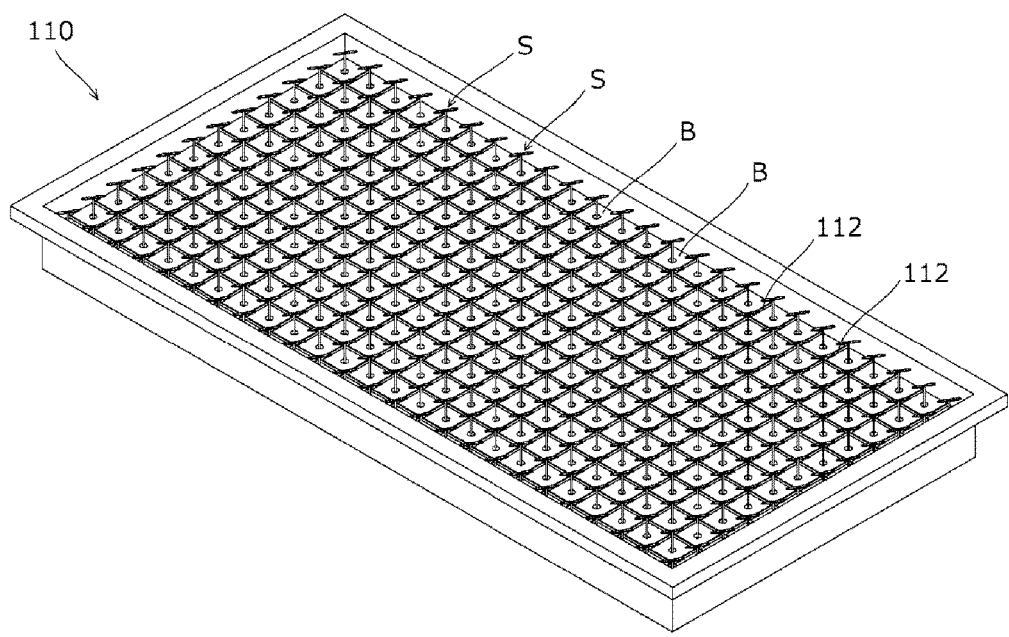
FIG. 8 is a perspective view showing the planter with seedbeds housed therein.
Figure 9:
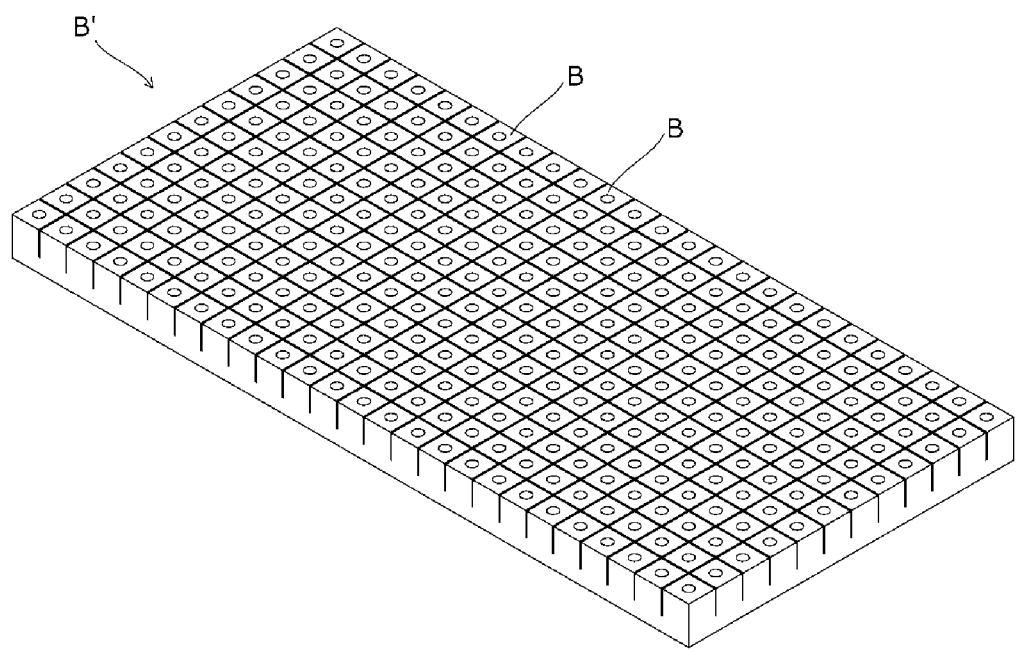
FIG. 9 is a perspective view showing the seedbeds.

The planter 110 is formed from a strong material such as metal, and as shown in FIGS. 6 to 8, includes a plurality of planter seedbed-holding holes 111 that penetrate in a vertical direction in order to hold the seedbeds B, a thin plate-shaped partition 112 that partitions the planter seedbed-holding holes 111 in vertical and horizontal directions, and a flange portion 113 formed on an upper end.

As shown in FIG. 7, the planter seedbed-holding holes 111 are arranged in a rectangular lattice shape at a first pitch P1 in the vertical direction and a third pitch P3 in the horizontal direction when seen in the vertical direction. Note that in the present invention, the term "pitch" denotes a pitch between respective centers of holes or members.

The partition 112 is disposed such that surfaces thereof are perpendicular to the horizontal direction, and as is evident from FIG. 8, the partition 112 is formed to be capable of cutting a seedbed B' into the plurality of seedbeds B and housing the seedbeds B collectively in the plurality of planter seedbed-holding holes when the planter is pressed onto the seedbed B'.

As shown in FIG. 1, the flange portion 113 is provided to be held by a planter holding member 131, and also functions as a handling engagement portion used by the handling mechanism (not shown) to handle the planter 110. A hole, a projection, and so on may also be used as the handling engagement portion.

Figure 10:
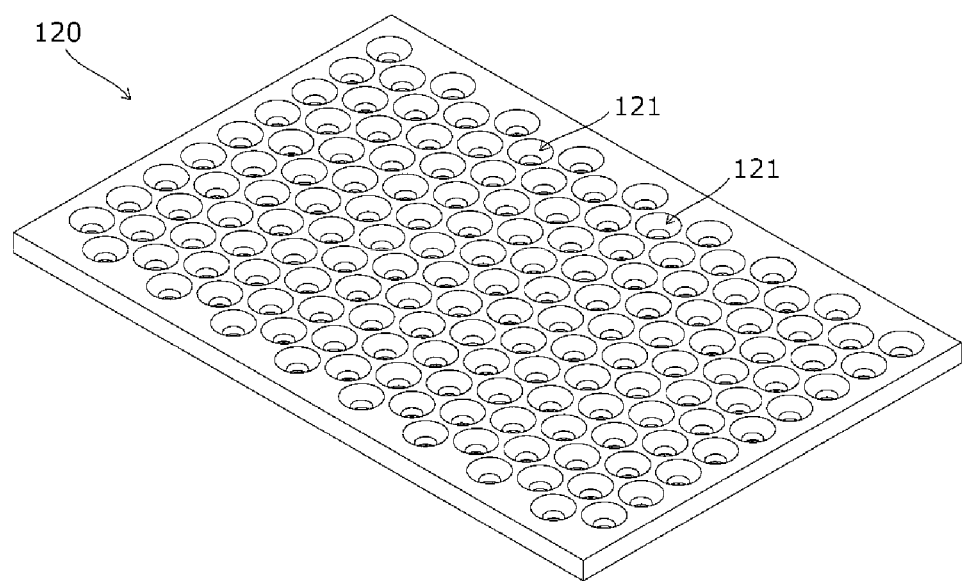
FIG. 10 is a perspective view showing a growing pallet.
Figure 12:
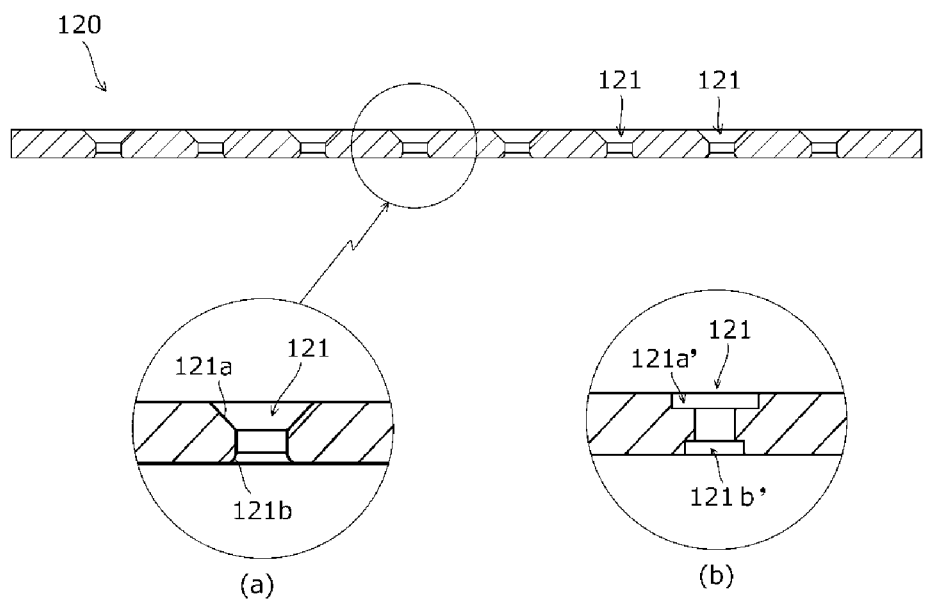
FIG. 12 is a sectional view of the growing pallet, taken along an XII-XII line in FIG. 11 and seen from the direction of an arrow.

The growing pallet 120 is formed from synthetic resin or the like (mainly foamed polystyrene), and as shown in FIGS. 10 and 12, includes a plurality of rounded hole-shaped pallet seedbed-holding holes 121 that penetrate in the vertical direction in order to hold the seedbeds B.

As shown in FIG. 12($a$), in each pallet seedbed-holding hole 121, an upward tapering portion 121$a$ that expands in diameter upward is formed on an upper surface side of the growing pallet 120, and a downward tapering portion 121$b$ that decreases in diameter upward is formed on a lower surface side of the growing pallet 120.

Note that in a modified example of the pallet seedbed-holding hole 121, as shown in FIG. 12($b$), an upward countersink portion 121$a'$ may be formed on the upper surface side of the growing pallet 120 and a lower countersink portion 121$b'$ may be formed on the lower surface side of the growing pallet 120.

Figure 11:
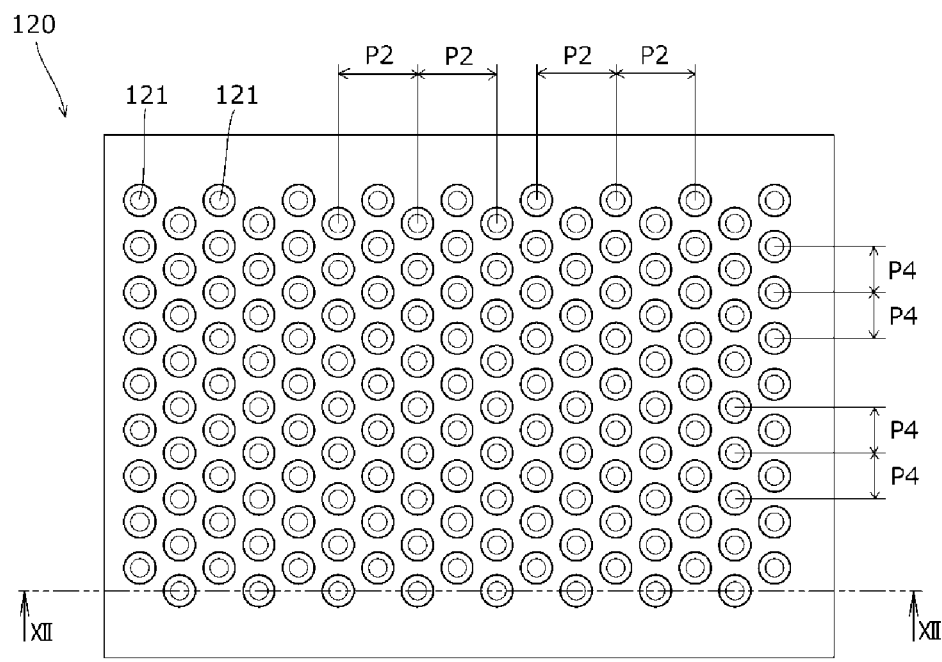
FIG. 11 is a top view showing the growing pallet.

As shown in FIG. 11, the plurality of pallet seedbed-holding holes 121 are arranged in a hexagonal lattice shape when seen in the vertical direction. As shown in FIG. 11, when a pitch between the pallet seedbed-holding holes 121 that are adjacent in the vertical direction, among the plurality of pallet seedbed-holding holes 121, is set as a second pitch P2, the first pitch P1 of the planter seedbed-holding holes 111 and the second pitch P2 of the pallet seedbed-holding holes 121 are set to satisfy an equation nP1=mP2 (where n is an integer of 1 or more and m is an integer of 1 or more). The second pitch P2 is larger than the first pitch P1. Further, as shown in FIG. 11, when a pitch between the pallet seedbed-holding holes 121 that are adjacent in the horizontal direction, among the plurality of pallet seedbed-holding holes 121, is set as a fourth pitch P4, the third pitch P3 of the planter seedbed-holding holes 111 and the fourth pitch P4 of the pallet seedbed-holding holes 121 are set to satisfy an equation oP3=pP4 (where o is an integer of 1 or more and p is an integer of 1 or more). The fourth pitch P4 is larger than the third pitch P3.

The seedling container (not shown) is filled with water, and accommodates the planter 110 holding the plurality of seedbeds B, as shown in FIG. 8, so that plant seeds sown in the seedbeds B can germinate. The seedling container (not shown) is required to be watertight, and may be provided with a handle and so on for automation.

The planter holding/moving mechanism 130 holds the planter 110 above the push-up mechanism 150, and moves the planter 110 in the vertical and horizontal directions. As shown in FIGS. 1 to 3, the planter holding/moving mechanism 130 includes the planter holding member 131 for holding the planter 110, a horizontal direction linear actuator 132 for moving the planter holding member 131 in the horizontal direction, and a vertical direction linear actuator 133 for moving the planter holding member 131 in the vertical direction. Note that the planter holding/moving mechanism 130 is not limited to the specific configuration described above, and may take any form, such as a hand arm that holds and moves the planter 110.

As shown in FIG. 1, the pallet holding mechanism 140 holds the growing pallet 120 in a fixed condition above the planter 110 held by the planter holding/moving mechanism described above, and includes a table 141 for carrying the growing pallet 120, and a plurality of float-up restricting portions 142 for restricting upward movement of the growing pallet 120 relative to the table 141. The table 141 and the float-up restricting portions 142 are fixed to the frame 160.

Figure 13:
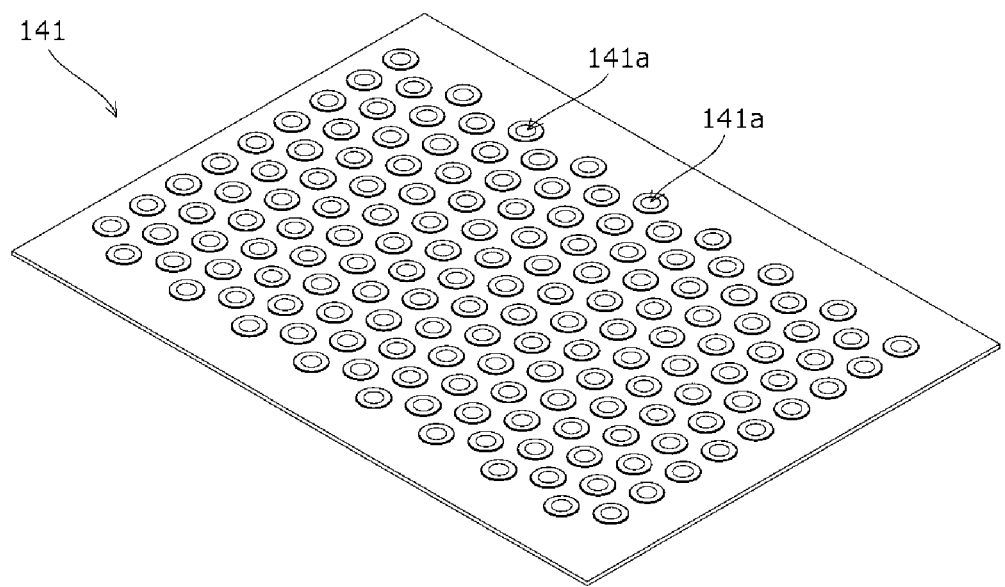
FIG. 13 is a perspective view showing a table.
Figure 14:
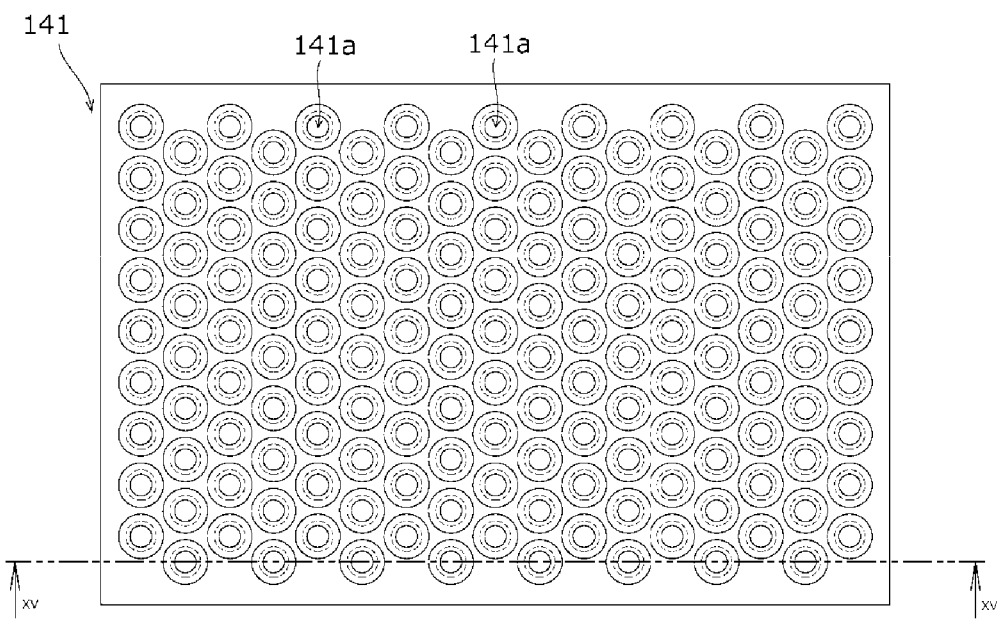
FIG. 14 is a top view showing the table.
Figure 15:
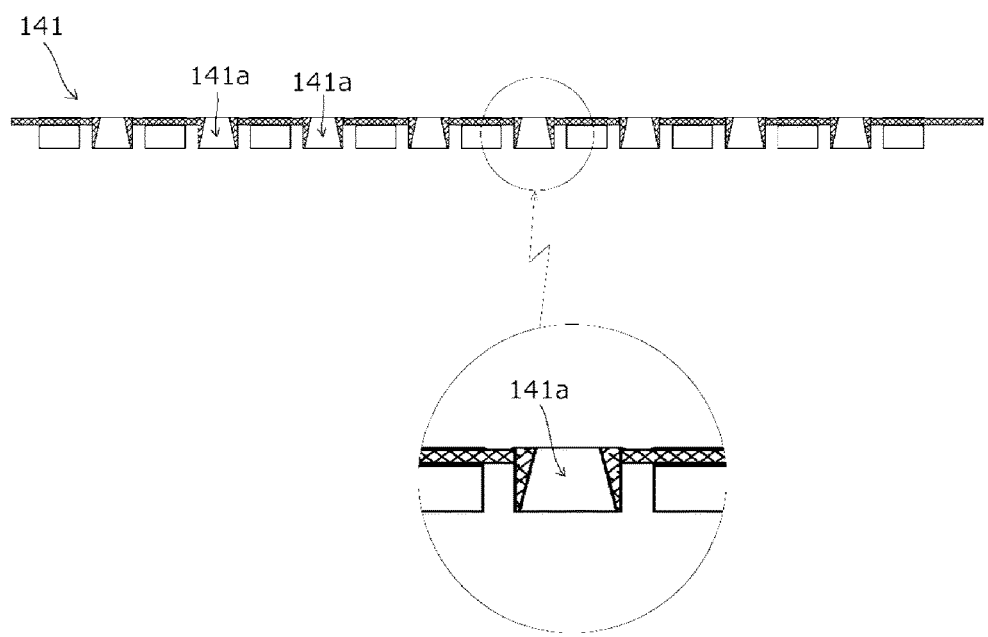
FIG. 15 is a sectional view of the table, taken along an XV-XV line in FIG. 14 and seen from the direction of an arrow.
Figure 16:
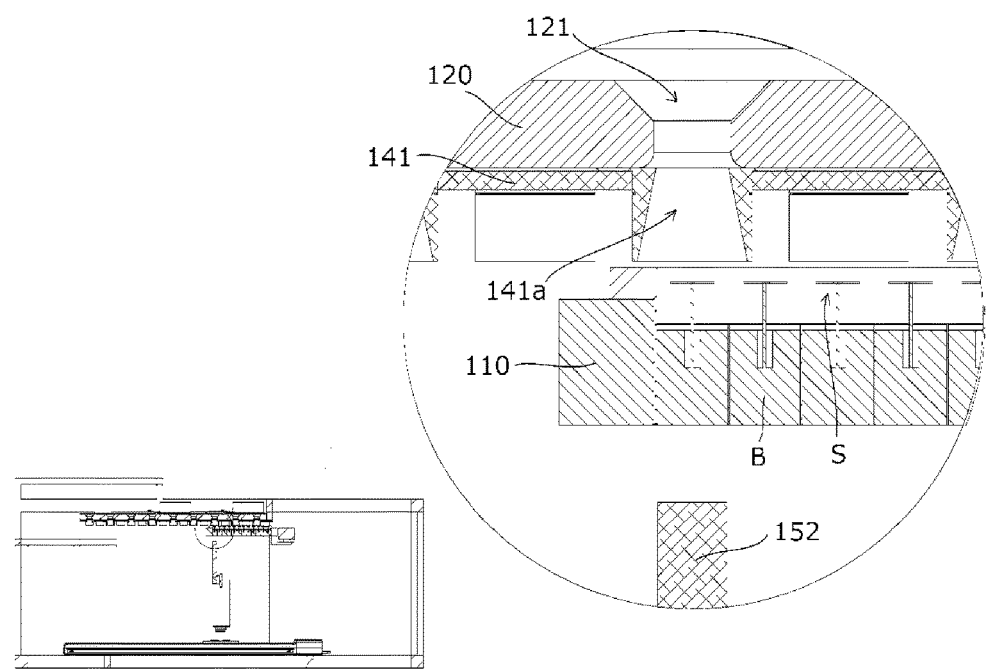
FIG. 16 is an illustrative view illustrating a condition prior to transplantation from the planter to the growing pallet.
Figure 17:
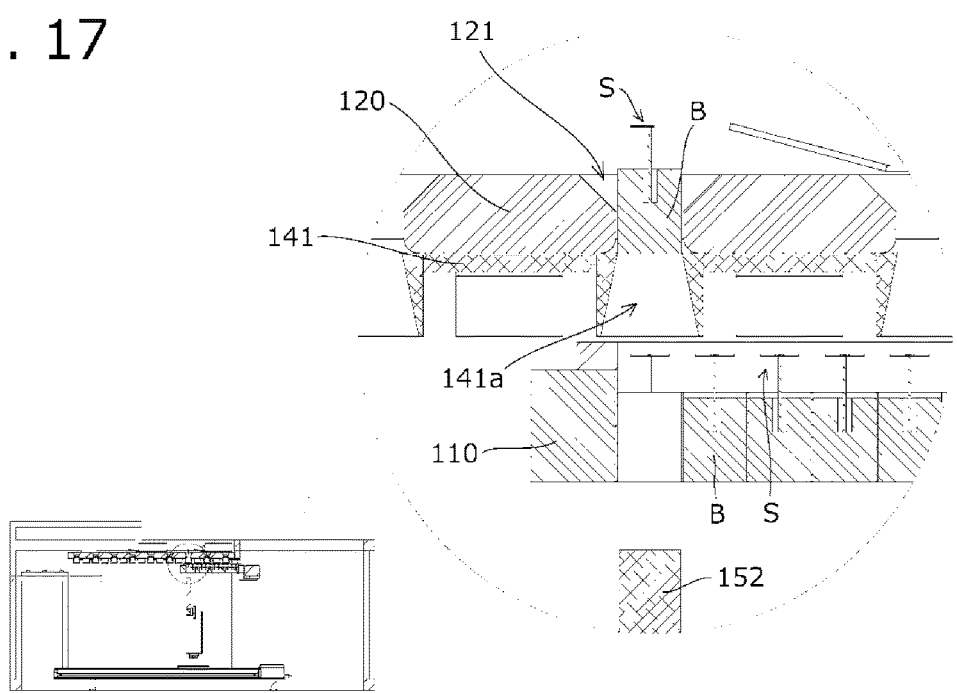
FIG. 17 is an illustrative view illustrating a condition following transplantation from the planter to the growing pallet.

As shown in FIGS. 13 and 15, the table 141 includes a plurality of guide holes 141$a$ penetrating in the vertical direction. The plurality of guide holes 141$a$ are disposed in an identical number to the plurality of pallet seedbed-holding holes 121, and arranged in an identical arrangement to the plurality of pallet seedbed-holding holes 121 when seen in the vertical direction. As shown in FIG. 15, at least a part of an inner peripheral surface of each guide hole 141$a$ is formed in a tapered shape so as to decrease in diameter upward.

Note that in this embodiment, the seedbeds B are guided by the guide holes 141$a$ formed in the table 141, but the table 141 may be omitted, and instead, the seedbeds B may be guided by the downward tapering portions 121$b$ formed on the lower surface side of the pallet seedbed-holding holes 121, as described above. In this case, a member or a part that supports the growing pallet 120 may be provided separately in place of the table 141.

Further, in this embodiment, the guide holes 141$a$ in the table 141 are provided in an identical number and an identical arrangement to the pallet seedbed-holding holes 121 in the growing pallet 120. However, in a case where the growing pallet 120 is configured to be moved in the horizontal direction, the guide holes 141$a$ are not limited to this arrangement. For example, the guide holes 141a may be provided in a single row in the horizontal direction at half the pitch of the fourth pitch P4 between the pallet seedbed-holding holes 121 in the horizontal direction such that when the pallet seedbed-holding holes 121 pass upward through the guide holes 141a, the seedbeds B held by the planter 110 are pushed up one row at a time. In this case, a push-up member 152 does not have to be moved in the vertical direction, and therefore the structure of the push-up mechanism 150 can be simplified.

As shown in FIG. 1, the float-up restricting portions 142 restrict upward movement of the growing pallet 120 relative to the table 141, and the growing pallet 120 is set relative to the table 141 by being pushed into the float-up restricting portions 142 from the side. The float-up restricting portions 142 also serve as positioning portions for positioning the growing pallet 120 in the horizontal direction. Note that the float-up restricting portions 142 and the aforementioned positioning portions are not limited to the specific configuration described above, and may take any form, such as a plurality of projections, a frame, and so on provided on the table 141.

The push-up mechanism 150 pushes the seedbeds B held in the planter seedbed-holding holes 111 upward in order to insert the seedbeds B into the pallet seedbed-holding holes 121.

As shown in FIGS. 1 to 4, the push-up mechanism 150 includes a push-up linear actuator 151, a plurality of push-up members 152 supported by the push-up linear actuator 151 to be capable of moving in the vertical direction, a horizontal direction movement linear actuator 153 for moving the push-up linear actuator 151 in the horizontal direction, and a vertical direction linear actuator 154 for moving the push-up linear actuator 151, the push-up members 152, and the horizontal direction movement linear actuator 153 in the vertical direction. The plurality of push-up members 152 are disposed relative to the push-ups linear actuator 151 in a single row in the horizontal direction, and supported by the horizontal direction movement linear actuator 153 and the vertical direction linear actuator 154 to be capable of moving in the vertical and horizontal directions. The plurality of push-up members 152 are configured to be moved in the vertical direction either singly or in single row units by a plurality of linear actuators disposed in the push-up linear actuator 151.

Note that in this embodiment, the push-up member 152 is provided in a plurality, but the push-up member 152 may also be provided singly. Further, when the push-up members 152 are disposed in an identical number to the plurality of pallet seedbed-holding holes 121 and disposed in an identical arrangement to the plurality of pallet seedbed-holding holes 121 when seen in the vertical direction, there is no need to move the push-up members 152 in the horizontal direction, and therefore the structure of the push-up mechanism 150 can be simplified.

The handling mechanism (not shown) moves the planter 110 to the planter holding member 131 and sets the planter 110 in the planter holding member 131. The handling mechanism (not shown) may include a gripping pawl, a support arm, and so on, and the specific form thereof may be set as desired.

In the plant transplanting device 100 according to this embodiment, obtained as described above, one seedbed B is housed in each of the planter seedbed-holding holes 111 partitioned by the partition 112, and therefore the seedbeds B can be held reliably regardless of whether or not seedbeds B are held in the planter seedbed-holding holes 111 on the periphery.

Further, by moving the small planter 110, movement space can be secured more easily than when the large growing pallet 120 is moved, and therefore space can be saved.

Furthermore, by providing the push-up mechanism 150 with the plurality of push-up members 152, the plurality of seedbeds B can be transplanted collectively in a single push-up operation, and therefore transplantation can be achieved in a short time.

Moreover, by providing the handling mechanism (not shown) to move the planter 110 to the planter holding/moving mechanism 130, direct contact with the planter 110 by human hands can be avoided when setting the planter 110 in the planter holding/moving mechanism 130, and therefore contamination of the seedbeds B by human sweat and bacteria can be prevented.

Next, a plant transplanting device 200 according to a second embodiment of the present invention will be described on the basis of FIGS. 18 to 25. Here, the second embodiment is configured identically to the first embodiment described above apart from the configuration of the push-up mechanism. Therefore, reference symbols in the 100s described in the specification and illustrated in the drawings in relation to the first embodiment have been replaced by reference symbols in the 200s, and description of configurations other than the push-up mechanism has been omitted.

First, in the first embodiment described above, the push-up members 152 are formed in a rod shape and function only to push up the seedbeds B, but in the second embodiment, a plurality of gripping arms 252a are provided as push-up members 252, and the push-up members 252 are configured to grip the seedbeds B with the gripping arms 252a when pushing up the seedbeds B.

Figure 18:
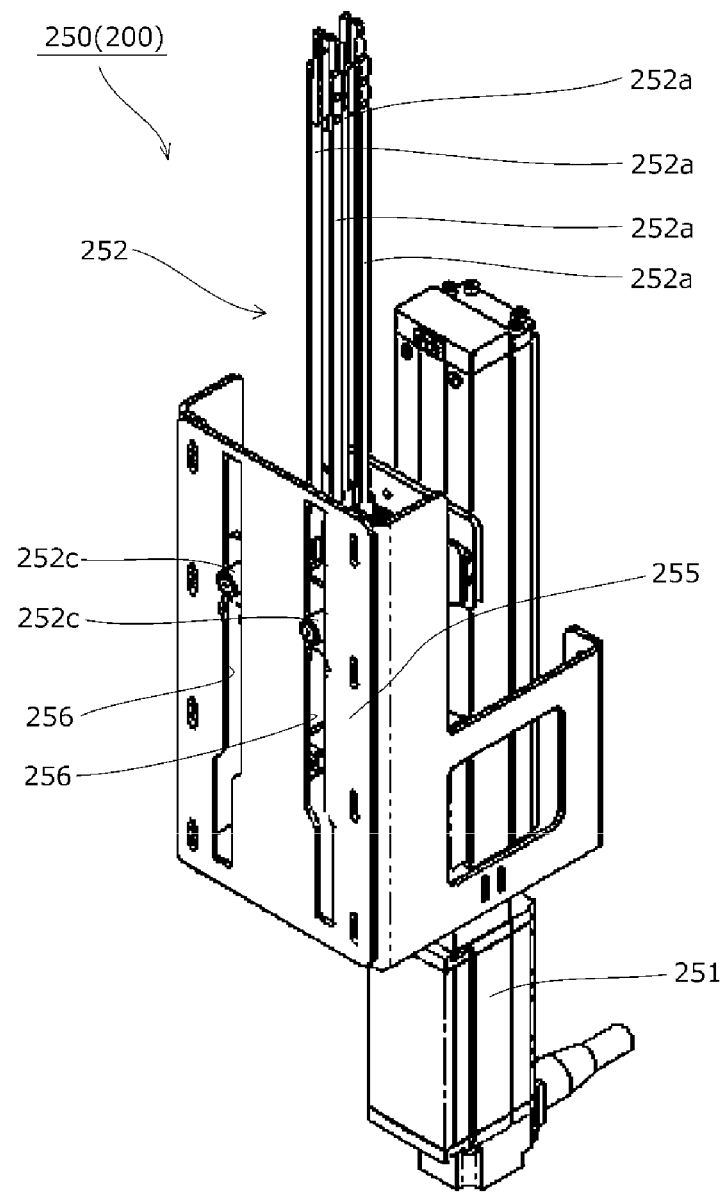
FIG. 18 is a perspective view showing a part of a push-up mechanism according to a second embodiment of the present invention.
Figure 19:
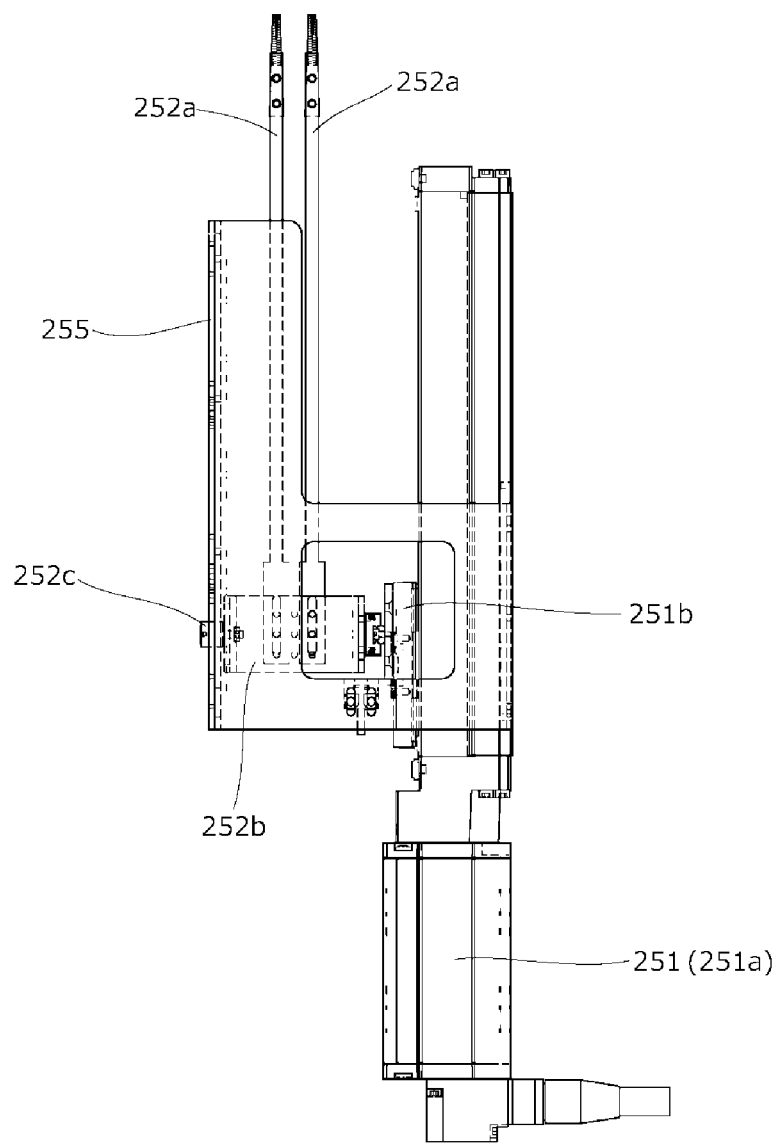
FIG. 19 is an illustrative view showing the push-up mechanism according to the second embodiment from the side.
Figure 20:
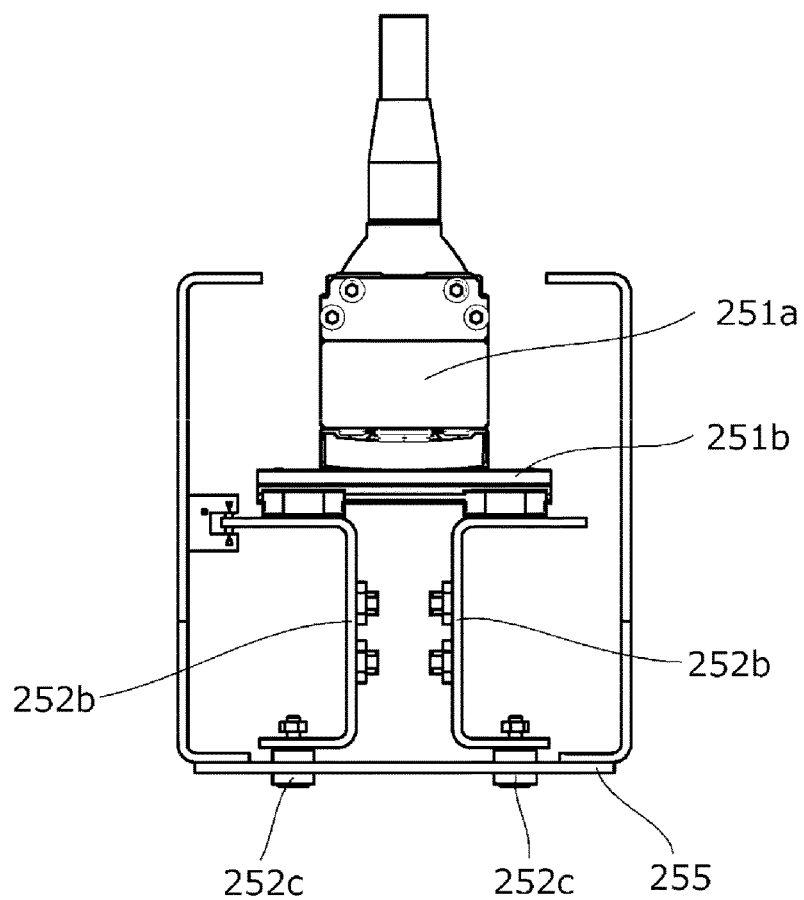
FIG. 20 is an illustrative view showing the push-up mechanism according to the second embodiment from above.

More specifically, in the second embodiment, as shown in FIGS. 18 to 20, each push-up member 252 includes a total of four gripping arms 252a, two arm support portions 252b, each of which supports two of the gripping arms 252a, and a cam follower portion 252c attached to each arm support portion 252b. The arm support portions 252b are attached to a vertical movable portion 251b of a push-up linear actuator 251 so as to be capable of sliding in the horizontal direction, the vertical movable portion 251b being capable of moving in the vertical direction.

Figure 21:
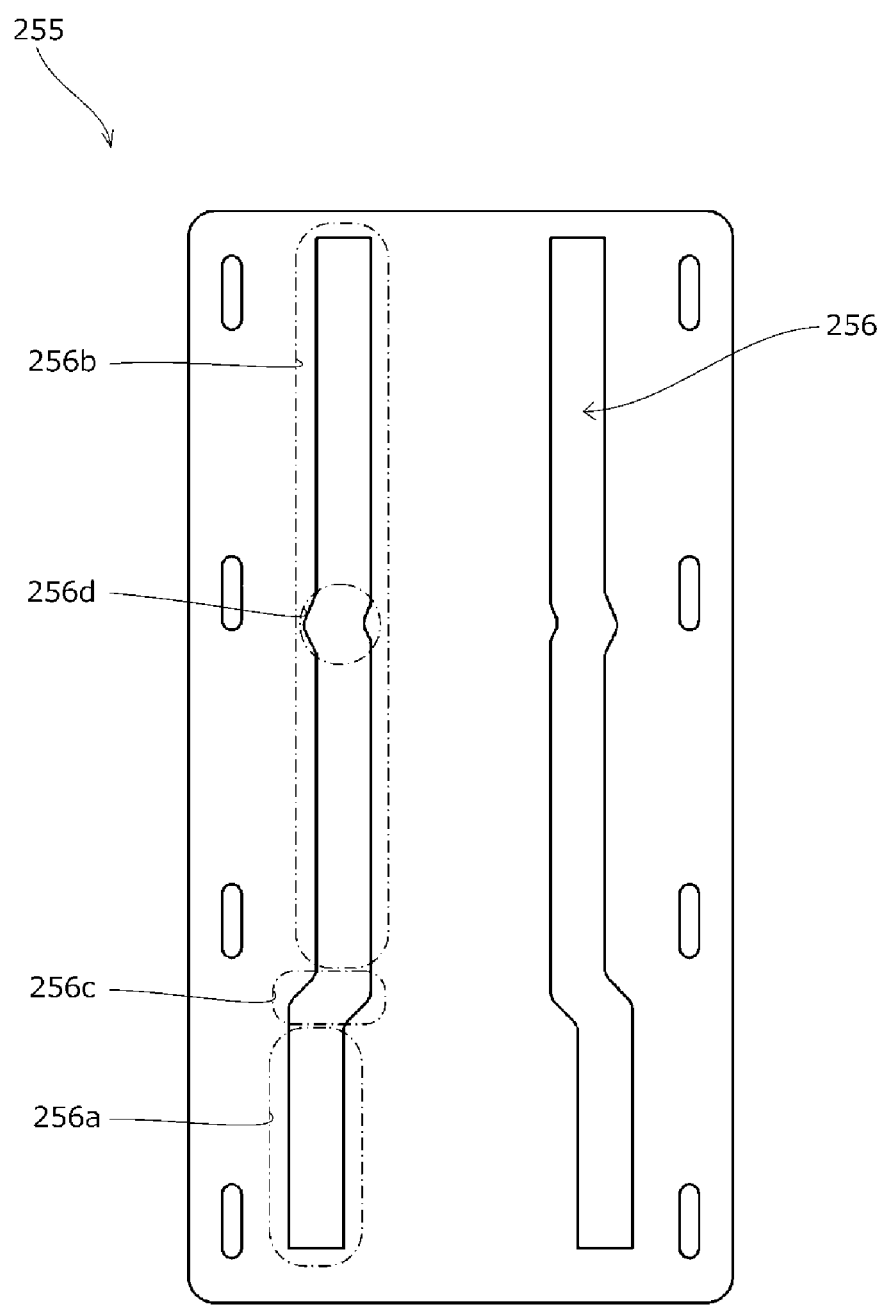
FIG. 21 is a plan view showing an arm control member according to the second embodiment.
Figure 22:
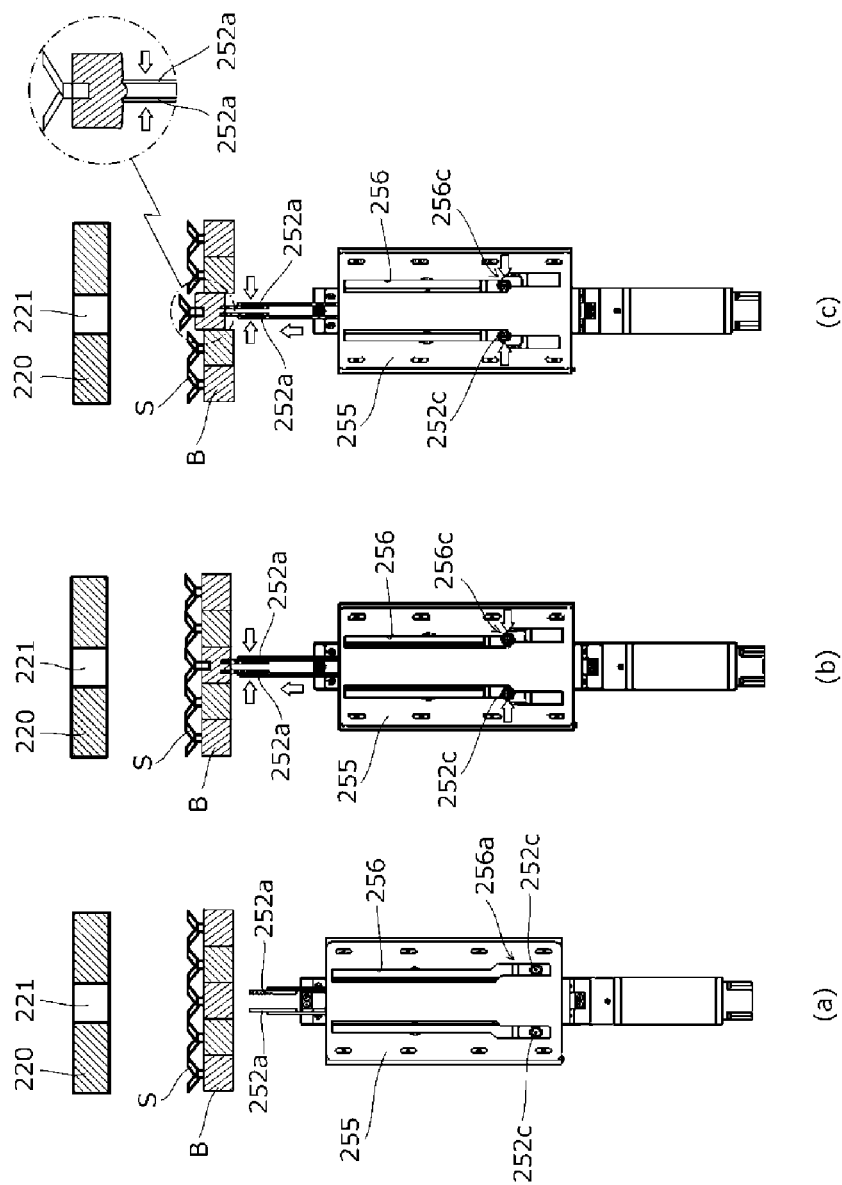
FIG. 22 is an illustrative view showing first to third processes of a transplantation flow according to the second embodiment.
Figure 23:
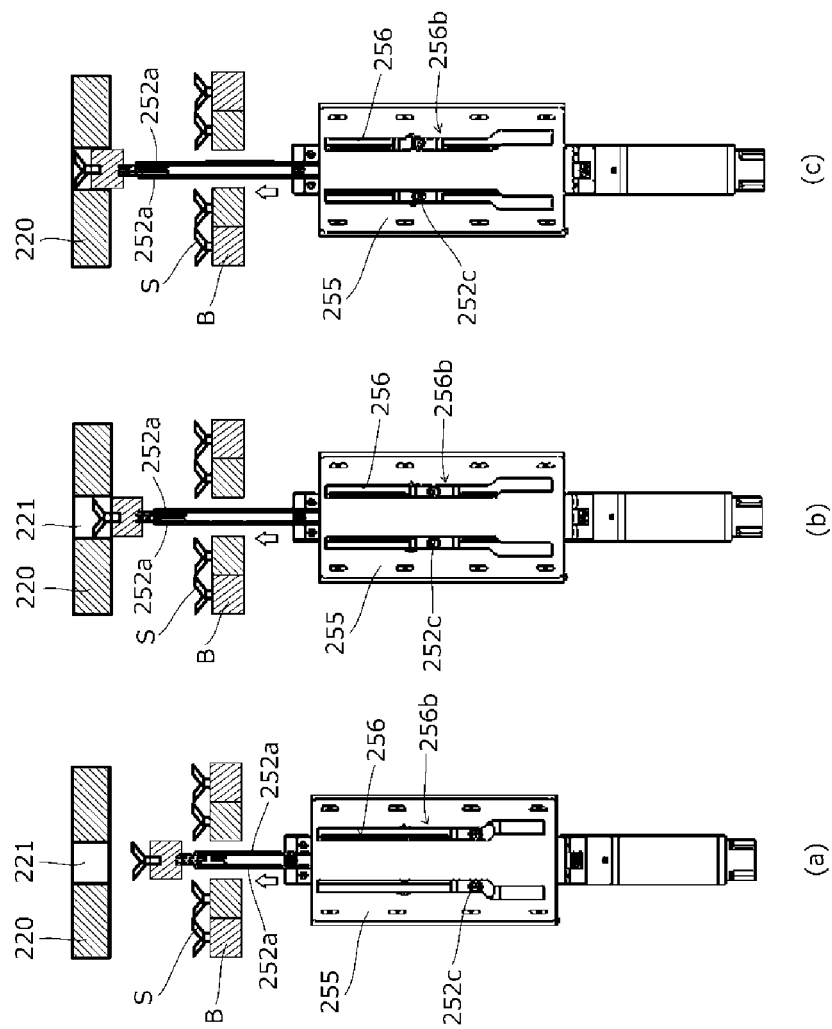
FIG. 23 is an illustrative view showing fourth to sixth processes of the transplantation flow according to the second embodiment.
Figure 24:
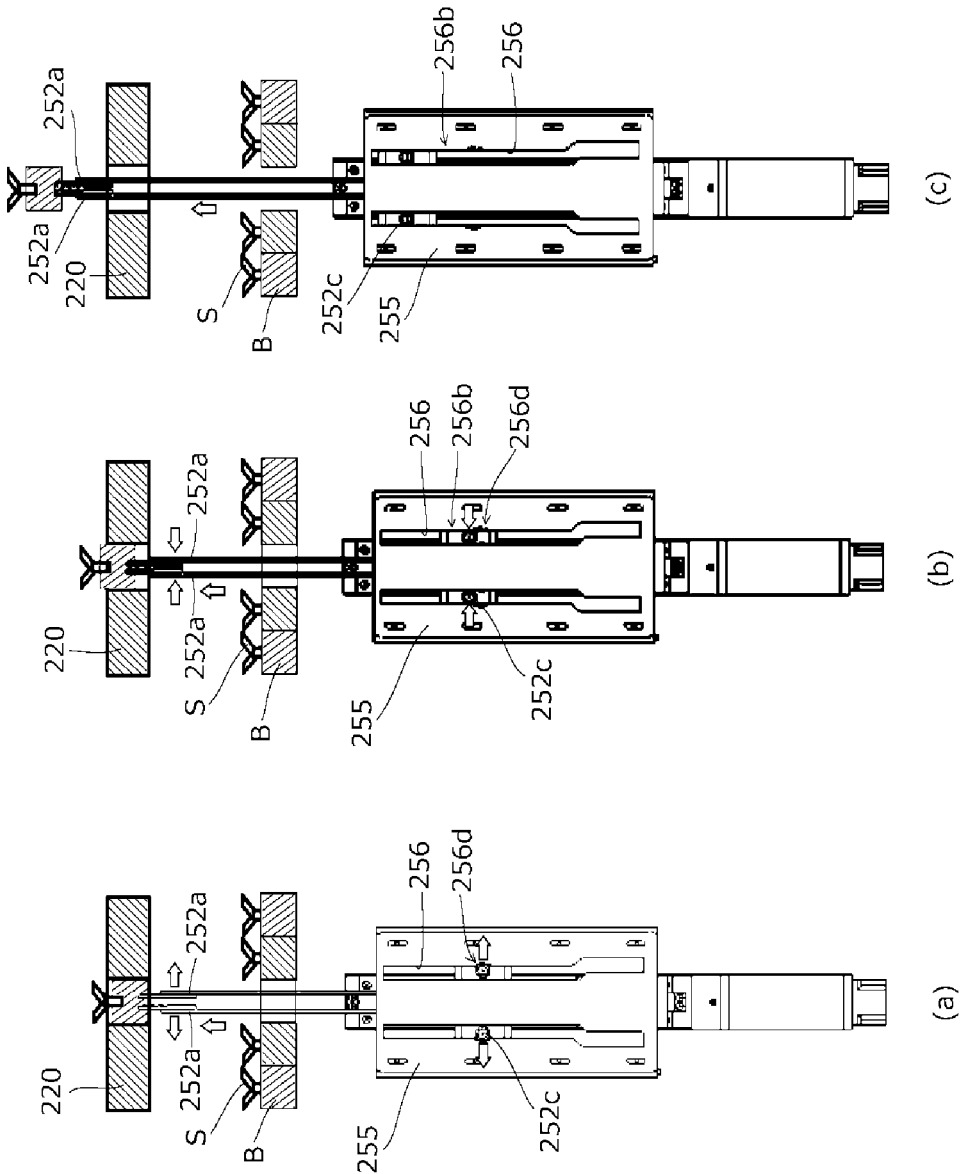
FIG. 24 is an illustrative view showing seventh to ninth processes of the transplantation flow according to the second embodiment.
Figure 25:
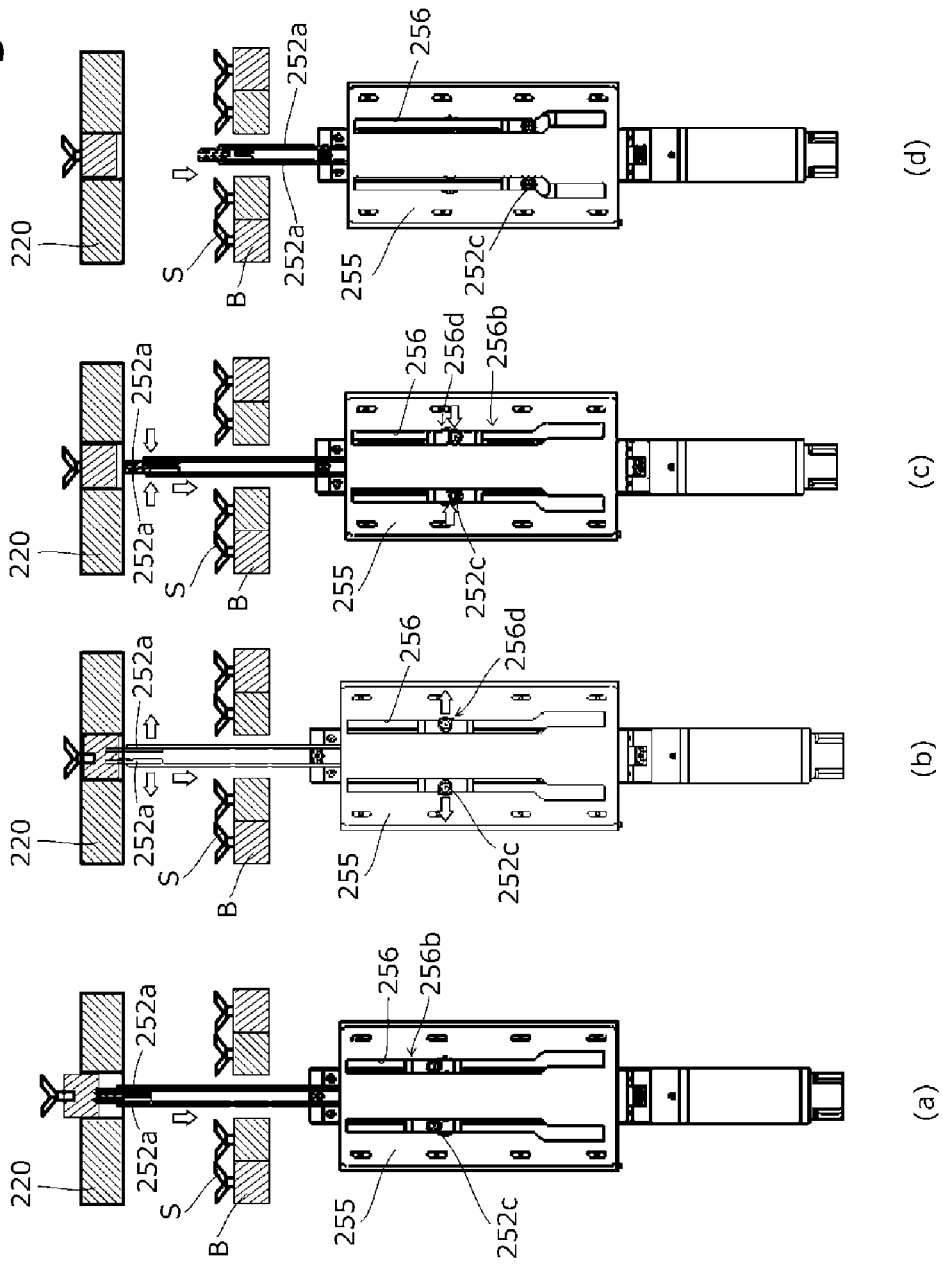
FIG. 25 is an illustrative view showing tenth to thirteenth processes of the transplantation flow according to the second embodiment.

A push-up mechanism 250 further includes an arm control member 255 fixed to a main body portion 251a of the push-up linear actuator 251 that drives the vertical movable portion 251b, and a groove-shaped opening/closing control cam portion 256 is formed in the arm control member 255. The cam follower portion 252c moves in the vertical direction while sliding against the opening/closing control cam portion 256, and in accordance with this sliding motion, the opening/closing control cam portion 256 controls horizontal direction movement of the gripping arms 252a. As shown in FIG. 21, the opening/closing control cam portion 256 includes an opening area portion 256a in which an interval between the plurality of gripping arms 252a is controlled to an interval at which the seedbed B is not gripped, a closing area portion 256b formed above the opening area portion 256a, in which the interval between the plurality of gripping arms 252a is controlled to an interval at which the seedbed B is gripped, and a shift area portion 256c formed between the opening area portion 256a and the closing area portion 256b. A temporary opening area portion 256d in which the interval between the plurality of gripping arms 252a is widened in order to release the seedbed B is formed in the closing area portion 256b.

Next, a transplantation flow according to the second embodiment, which is executed on the seedbeds B, will be described on the basis of FIGS. 22 to 25.

First, in an initial condition shown in FIG. 22(a), the cam follower portion 252c is positioned in the opening area portion 256a of the opening/closing control cam portion 256, and therefore the interval between the gripping arms 252a is controlled to the interval at which the seedbed B is not gripped.

Next, as shown in FIGS. 22(b) and (c), when the entire push-up member 252 is moved upward by the push-up linear actuator 251, the cam follower portion 252c is pushed in the horizontal direction through the shift area portion 256c of the opening/closing control cam portion 256, thereby moving the gripping arms 252a upward while narrowing the interval between the gripping arms 252a. As a result, the seedbed B is pushed up while gripped by the gripping arms 252a so as to be pushed out of the planter seedbed-holding hole 211 of the planter 210.

Next, as shown in FIGS. 23(a) to (c), the seedbed B is pushed up while gripped by gripping arms 252a.

Next, as shown in FIG. 24(a), at a timing where the seedbed B is inserted into the pallet seedbed-holding hole 221, the cam follower portion 252c is pushed through the temporary opening area portion 256d of the opening/closing control cam portion 256, and as a result, the interval between the gripping arms 252a is widened such that the seedbed B is released. At this timing, however, the seedbed B is inserted into the pallet seedbed-holding hole 221, and therefore the seedbed B does not fall.

Next, as shown in FIGS. 24(b) and (c), the seedbeds B is pushed up while gripped by the gripping arms 252a so as to be pushed upward out of the pallet seedbed-holding hole 221.

Next, as shown in FIG. 25(a), after switching the direction in which the push-up member 252 is moved by the push-up linear actuator 251 to a downward direction, the seedbed B is transported downward while gripped by the gripping arms 252a so as to be inserted back into the pallet seedbed-holding hole 221.

By pushing the seedbed B upward out of the pallet seedbed-holding hole 221 and then inserting the seedbed B back into the pallet seedbed-holding hole 221 from above in this manner, a situation which a plant shoot S of the seedbed B is trapped between the pallet seedbed-holding hole 221 and the seedbed B can be avoided even when the plant shoot S spreads out horizontally.

Next, as shown in FIG. 25(b), at a timing where the seedbed B is inserted into the pallet seedbed-holding hole 221, the cam follower portion 252c is pushed through the temporary opening area portion 256d of the opening/closing control cam portion 256, whereby the interval between the gripping arms 252a is widened such that the seedbed B is released. Next, as shown in FIGS. 25(c) and (d), the gripping arms 252a are returned to their initial positions.

Note that in this embodiment, a total of four gripping arms are provided on each push-up member, but the number of gripping arms may be set at any number from two upward as long as the seedbed B can be gripped thereby.

Further, in this embodiment, all of the gripping arms are capable of moving in the horizontal direction, but the seedbed B may be gripped using a configuration in which some of the gripping arms are disposed in a fixed condition and the remaining gripping arms are provided to be capable of moving in the horizontal direction.

Furthermore, in this embodiment, the arm control member formed with the opening/closing control cam portion is provided, and the gripping arms are moved in the horizontal direction using the vertical direction movement of the gripping arms. However, the arm control member may be omitted, and instead, driving means such as an actuator may be provided separately to move the gripping arms in the horizontal direction.

Moreover, an anti-slip portion such as a surface irregularity or a groove may be provided on the part of the gripping arm that grips the seedbed. In this case, the seedbed can be gripped reliably by a small gripping force.

Next, a plant transplanting device 300 according to a third embodiment of the present invention will be described on the basis of FIG. 26. Here, the third embodiment is configured identically to the second embodiment described above apart from the configuration of the opening/closing control cam portion of the arm control member. Therefore, reference symbols in the 200s described in the specification and illustrated in the drawings in relation to the second embodiment have been replaced by reference symbols in the 300s, and description of configurations other than the opening/closing control cam portion has been omitted.

Figure 26:
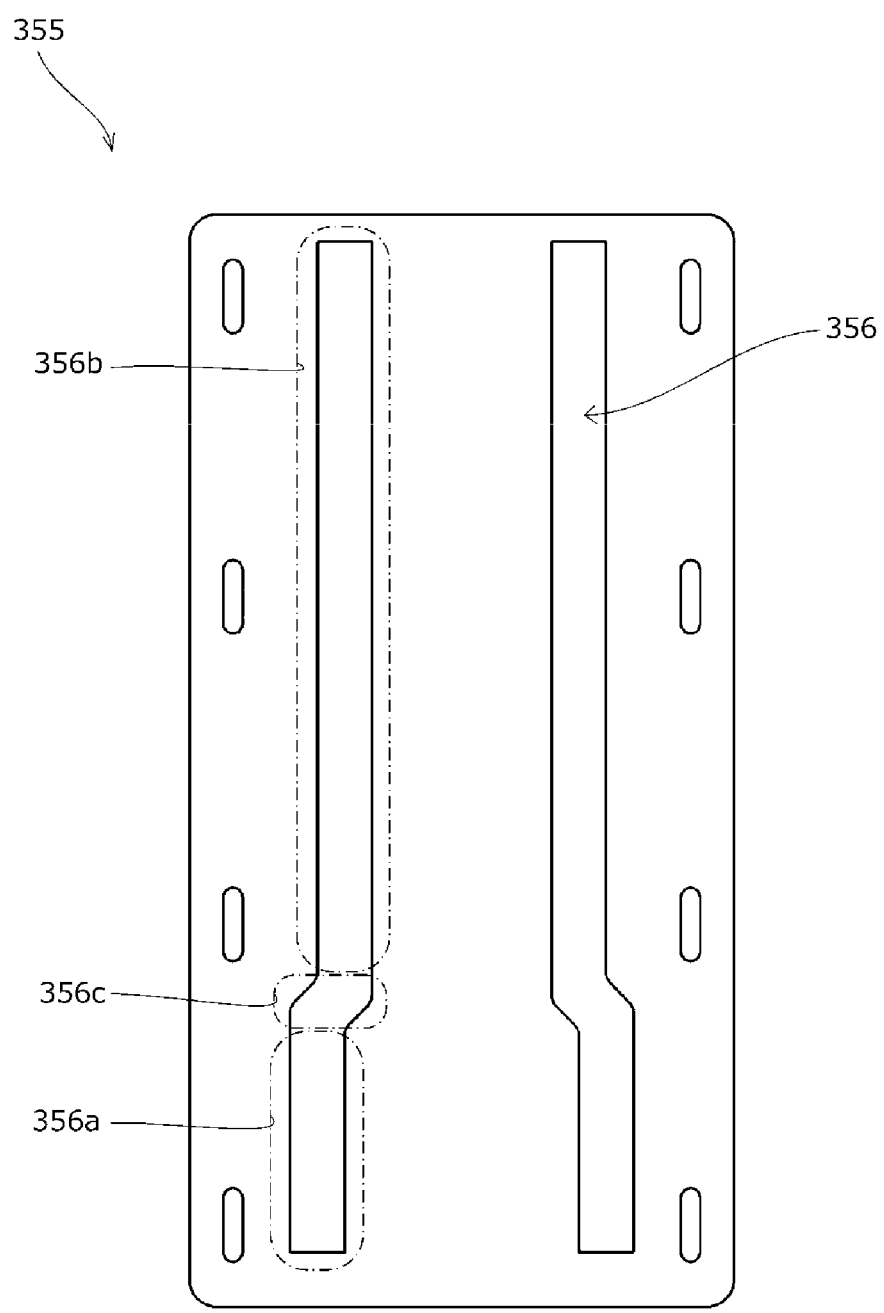
FIG. 26 is a plan view showing an arm control member according to a third embodiment.

First, in the third embodiment, as shown in FIG. 26, the temporary opening area portion 256d according to the second embodiment is not provided in an opening/closing control cam portion 356 of an arm control member 355. Hence, in the third embodiment, the interval between gripping arms 352a is not widened temporarily at the timing shown in FIGS. 24(a) and 25(b), and therefore the interval between the gripping arms 352a is maintained at the interval for gripping the seedbed B.

In the third embodiment, a relationship between a resistance (a frictional force or the like) generated between a pallet seedbed-holding hole 321 and the seedbed B and a gripping force applied by the gripping arms 352a is set such that at the timing where the seedbed B is inserted back into the pallet seedbed-holding hole 321 from above, as shown in FIG. 25(b), the grip applied to the seedbed B by the gripping arms 352a is released in accordance with the resistance (the frictional force or the like) generated between the pallet seedbed-holding hole 321 and the seedbed B, with the result that the seedbed B remains in the pallet seedbed-holding hole 321. Note that when the seedbed B is inserted into the pallet seedbed-holding hole 321 from below, as shown in FIG. 24(a), the seedbed B is pushed up by the gripping arms 352a, and therefore the seedbed B does not remain in the pallet seedbed-holding hole 321 in accordance with the resistance generated between the pallet seedbed-holding hole 321 and the seedbed B.

Further, when the seedbed B is inserted back into the pallet seedbed-holding hole 321 from above, as shown in FIG. 25(b), in a case where the upward tapering portion 121a shown in FIG. 12(a) is formed on the upper surface side of a growing pallet 320, the resistance (the frictional force or the like) generated between the pallet seedbed-holding hole 321 and the seedbed B gradually increases, and as a result, the seedbed B can be held in a predetermined position within the pallet seedbed-holding hole 321 more easily.

Note that in a case where the temporary opening area portion 256d is provided in the opening/closing control cam portion 256, as in the second embodiment, the relationship between the resistance (the frictional force or the like) generated between the pallet seedbed-holding hole 221 and the seedbed B and the gripping force generated by the gripping arms 252a may be set such that at the timing of FIG. 25(b), the grip applied to the seedbed B by the gripping arms 252a is not released unless the interval between the gripping arms 252 a is widened by the temporary opening area portion 256d.

Figure 27:
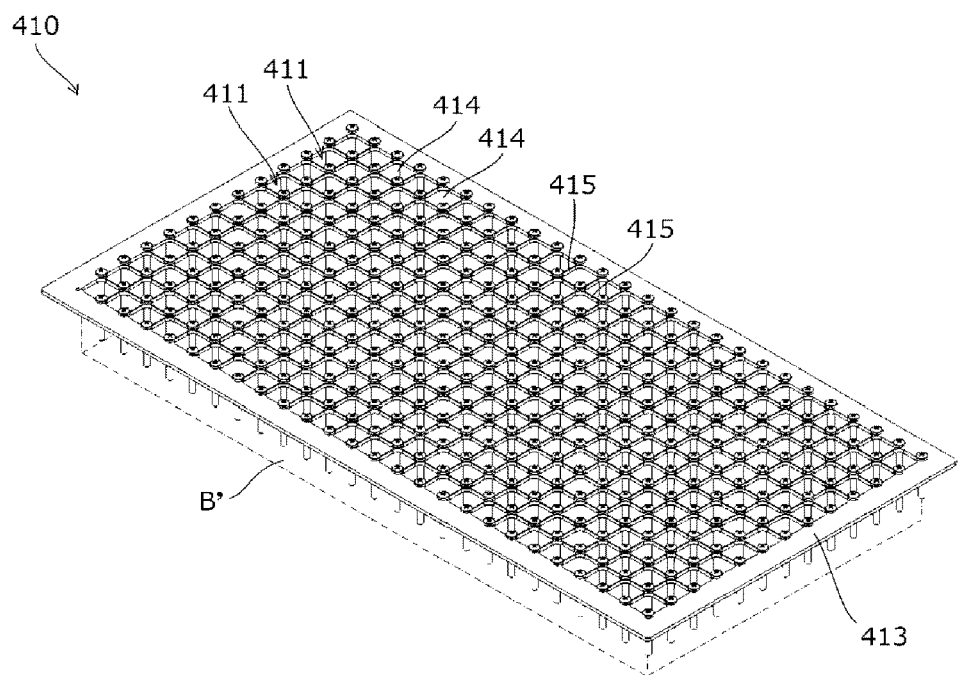
FIG. 27 is a perspective view showing a planter according to a fourth embodiment.

Next, a plant transplanting device 400 according to a fourth embodiment of the present invention will be described on the basis of FIG. 27. Here, the fourth embodiment is configured identically to the first embodiment described above apart from the configuration of the planter. Therefore, reference symbols in the 100s described in the specification and illustrated in the drawings in relation to the first embodiment have been replaced by reference symbols in the 400s, and description of configurations other than the planter has been omitted.

A planter 410 according to the fourth embodiment includes, in place of the partition 112 according to the first embodiment, a plurality of holding pins 414 extending in the vertical direction and a plurality of connecting portions 415 extending in the vertical direction and the horizontal direction. The plurality of holding pins 414 are arranged in a lattice shape when seen in the vertical direction, and the plurality of connecting portions 415 connect the plurality of holding pins 414 in the vertical direction and the horizontal direction. Spaces defined by the plurality of holding pins 414 and the plurality of connecting portions 415 function as planter seedbed-holding holes 411. In the fourth embodiment, when the planter 410 is set on the seedbed B', the planter 410 is pressed onto the seedbed B' so that the plurality of holding pins 414 pierce the seedbed B'. Note that a tip end (a lower end) of the holding pin 414 may be pointed, and in this case, the holding pins 414 can pierce the seedbed B' more easily. Further, a measure for increasing friction between the holding pin 414 and the seedbed B, such as forming irregularities on the surface of the holding pin 414, may be implemented on the holding pin 414, and in this case, a holding force applied to the seedbed B by the holding pin 414 is increased.

Next, a plant transplanting device 500 according to a fifth embodiment of the present invention will be described on the basis of FIGS. 28 to 30. Here, the fifth embodiment is configured identically to the first embodiment described above apart from the configuration of the planter. Therefore, reference symbols in the 100s described in the specification and illustrated in the drawings in relation to the first embodiment have been replaced by reference symbols in the 500s, and description of configurations other than the planter has been omitted.

Figure 28:
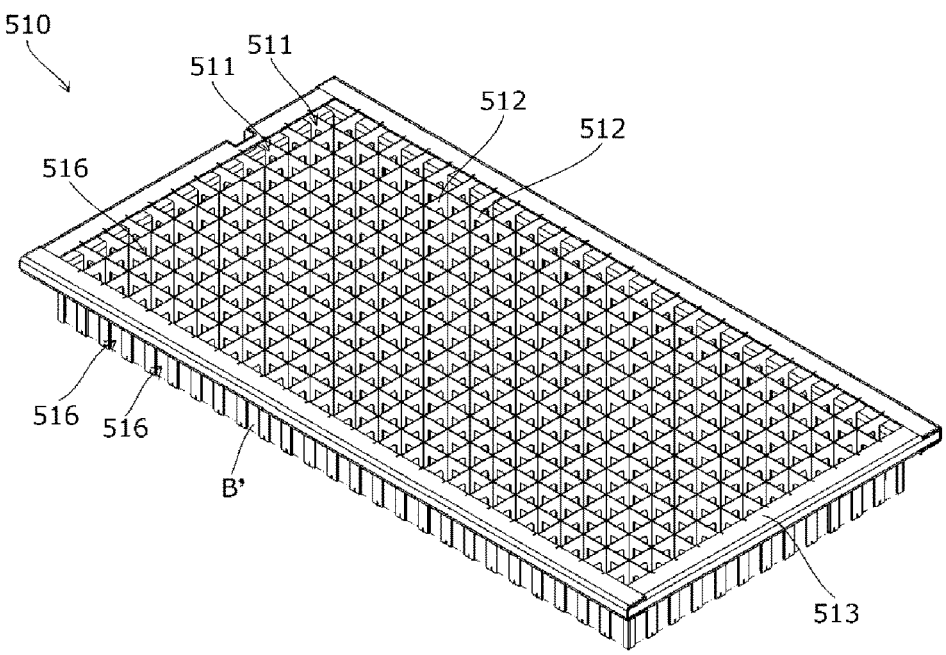
FIG. 28 is a perspective view showing a planter according to a fifth embodiment.
Figure 29:
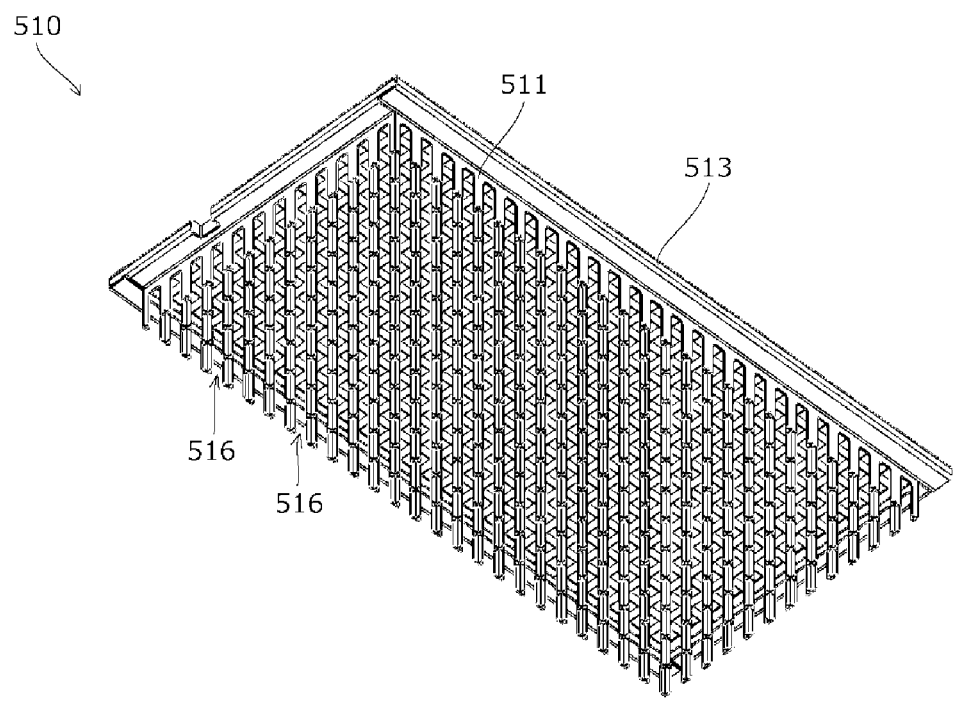
FIG. 29 is a perspective view showing the planter according to the fifth embodiment from a lower surface side.
Figure 30:
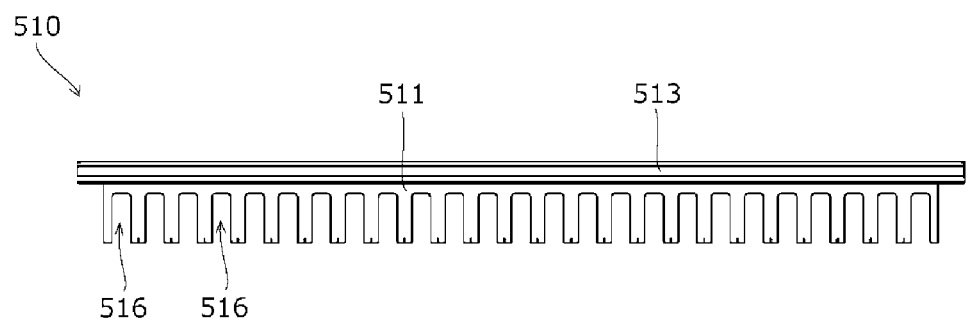
FIG. 30 is a side view showing the planter according to the fifth embodiment.

In a planter 510 according to the fifth embodiment, as shown in FIGS. 28 to 30, a plurality of cutout portions 516 are formed in a lower end of a thin plate-shaped partition 512. The plurality of cutout portions 516 are formed at intervals corresponding to planter seedbed-holding holes 511 so as to prevent the plant shoots S from becoming trapped between the partition 512 and the seedbeds B and being damaged as a result.

More specifically, when the plant shoot S exhibits large growth, the plant shoot S may become trapped between the partition 512 and the seedbed B, and in this case, the plant shoot S may be damaged by being scratched, sheared, or the like between the partition 512 and the seedbed B while the planter 510 is set on the seedbed B' or while the seedbed B held by the planter 510 is pushed up and transplanted. Hence, in the fifth embodiment, by forming the cutout portions 516 in the partition 512 at a sufficient height, the risk of the plant shoot S becoming trapped between the partition 512 and the seedbed B can be reduced, and even when the plant shoot S does become trapped between the partition 512 and the seedbed B, a scratched surface area of the plant shoot S can be reduced, leading to a reduction in the extent of the damage to the plant shoot S.

The invention claimed is:

1. A plant transplanting device for transplanting a seedbed from a planter, in which a plurality of planter seedbed-holding holes penetrating in a vertical direction are arranged in a horizontal direction, to a growing pallet, in which a plurality of pallet seedbed-holding holes penetrating in said vertical direction are arranged in said horizontal direction, the device comprising:
   a planter holding mechanism for holding said planter;
   a pallet holding mechanism for holding said growing pallet above a planter holding position in which said planter holding mechanism holds said planter; and
   a push-up mechanism for pushing said seedbed held in said planter seedbed-holding hole upward so as to insert said seedbed into said pallet seedbed-holding hole,
   wherein the push-up mechanism includes at least one push-up member capable of moving in the vertical direction,
   wherein the push-up mechanism is configured such that, by moving the push-up member upward, the push-up member pushes the seedbed held in the planter seedbed-holding hole upward and the push-up member inserts the seedbed into the pallet seedbed-holding holes from the bottom of the pallet seedbed-holding hole.

2. The plant transplanting device according to claim 1, further comprising said planter, wherein
   said planter includes a thin plate-shaped partition for partitioning said plurality of planter seedbed-holding holes.

3. The plant transplanting device according to claim 1, further comprising a moving mechanism for moving said planter and said growing pallet relative to each other in said horizontal direction.

4. The plant transplanting device according to claim 1, further comprising said planter and said growing pallet, wherein
   said push-up mechanism includes a plurality of the push-up members arranged in said horizontal direction, and
   when a pitch between said planter seedbed-holding holes that are adjacent in said vertical direction, among said plurality of planter seedbed-holding holes, is set as a first pitch and a pitch between said pallet seedbed-holding holes that are adjacent in said vertical direction, among said plurality of pallet seedbed-holding holes, is set as a second pitch in a case where said planter seedbed-holding holes and said pallet seedbed-holding holes are seen in said vertical direction,
   said first pitch and said second pitch are set to satisfy an equation nP1=mP2 (where P1 is said first pitch, P2 is said second pitch, n is an integer of 1 or more, and m is an integer of 1 or more).

5. The plant transplanting device according to claim 4, wherein when a pitch between said planter seedbed-holding holes that are adjacent in said horizontal direction, among said plurality of planter seedbed-holding holes, is set as a third pitch and a pitch between said pallet seedbed-holding holes that are adjacent in said horizontal direction, among said plurality of pallet seedbed-holding holes, is set as a fourth pitch in a case where said planter seedbed-holding holes and said pallet seedbed-holding holes are seen in said vertical direction, said third pitch and said fourth pitch are set to satisfy an equation oP3=pP4 (where P3 is said third pitch, P4 is said fourth pitch, o is an integer of 1 or more, and p is an integer of 1 or more).

6. The plant transplanting device according to claim 1, wherein said pallet holding mechanism includes a table for carrying said growing pallet, a float-up restricting portion that restricts upward movement of said growing pallet relative to said table, and a positioning portion that positions said table in said horizontal direction, a plurality of guide holes penetrating in said vertical direction are formed in said table, and said plurality of guide holes are disposed in an identical number to said plurality of pallet seedbed-holding holes and arranged in an identical arrangement to said plurality of pallet seedbed-holding holes when seen in said vertical direction.

7. The plant transplanting device according to claim 1, wherein said pallet holding mechanism includes a table for carrying said growing pallet, a plurality of guide holes penetrating in said vertical direction are formed in said table, and at least a part of an inner peripheral surface of said guide hole is formed in a tapered shape so as to decrease in diameter upward.

8. The plant transplanting device according to claim 1, wherein a tapered portion that increases in diameter upward is formed in said pallet seedbed-holding hole on an upper surface side of said growing pallet.

9. The plant transplanting device according to claim 1, wherein each of said push-up members includes a plurality of gripping arms.

10. The plant transplanting device according to claim 9, wherein at least one of said plurality of gripping arms of each of said push-up members is capable of moving in said horizontal direction, and a cam follower portion is fixed thereto, said push-up mechanism further includes an arm control member having an opening/closing control cam portion, and said cam follower portion slides against said opening/closing control cam portion, whereby said opening/closing control cam portion controls a horizontal direction interval between said plurality of gripping arms.

11. The plant transplanting device according to claim 10, wherein said opening/closing control cam portion includes an opening area portion in which said interval between said plurality of gripping arms is controlled to an interval at which said seedbed is not gripped, and a closing area portion which is formed above said opening area portion, and in which said interval between said plurality of gripping arms is controlled to an interval at which said seedbed is gripped, and a temporary opening area portion in which said interval between said plurality of gripping arms is widened in order to release said seedbed is formed in said closing area portion.

* * * * *